US 10,807,058 B2

(12) United States Patent
Kadokura et al.

(10) Patent No.: US 10,807,058 B2
(45) Date of Patent: *Oct. 20, 2020

(54) SILICA-TITANIA COMPOSITE AEROGEL PARTICLE, PHOTOCATALYST-FORMING COMPOSITION, AND PHOTOCATALYST

(71) Applicant: FUJI XEROX CO., LTD., Tokyo (JP)

(72) Inventors: Yasuo Kadokura, Kanagawa (JP); Yuka Zenitani, Kanagawa (JP); Hiroyoshi Okuno, Kanagawa (JP); Hideaki Yoshikawa, Kanagawa (JP); Yasunobu Kashima, Kanagawa (JP); Takeshi Iwanaga, Kanagawa (JP); Shunsuke Nozaki, Kanagawa (JP); Sakae Takeuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 240 days.

This patent is subject to a terminal disclaimer.

(21) Appl. No.: 15/916,649

(22) Filed: Mar. 9, 2018

(65) Prior Publication Data
US 2019/0076808 A1 Mar. 14, 2019

(30) Foreign Application Priority Data

Sep. 12, 2017 (JP) .................. 2017-174872

(51) Int. Cl.
| | |
|---|---|
| *B01J 13/00* | (2006.01) |
| *C01B 33/158* | (2006.01) |
| *C01B 33/159* | (2006.01) |
| *C01G 23/047* | (2006.01) |
| *B01J 31/12* | (2006.01) |
| *B01J 35/00* | (2006.01) |
| *B01J 35/10* | (2006.01) |
| *B01J 37/00* | (2006.01) |
| *B01J 35/02* | (2006.01) |
| *B01J 21/06* | (2006.01) |
| *B01J 37/02* | (2006.01) |
| *B01J 37/03* | (2006.01) |
| *B01J 21/08* | (2006.01) |
| *C01G 23/053* | (2006.01) |
| *B01J 31/02* | (2006.01) |

(52) U.S. Cl.
CPC ......... *B01J 13/0091* (2013.01); *B01J 21/063* (2013.01); *B01J 21/08* (2013.01); *B01J 31/122* (2013.01); *B01J 35/004* (2013.01); *B01J 35/023* (2013.01); *B01J 35/1019* (2013.01); *B01J 35/1023* (2013.01); *B01J 35/1028* (2013.01); *B01J 37/0009* (2013.01); *B01J 37/0236* (2013.01); *B01J 37/036* (2013.01); *C01B 33/159* (2013.01); *C01B 33/1585* (2013.01); *C01G 23/047* (2013.01); *C01G 23/053* (2013.01); *B01J 31/0212* (2013.01); *C01P 2002/84* (2013.01); *C01P 2002/85* (2013.01); *C01P 2004/51* (2013.01); *C01P 2004/61* (2013.01); *C01P 2004/62* (2013.01); *C01P 2004/64* (2013.01); *C01P 2006/12* (2013.01)

(58) Field of Classification Search
CPC ...... B01J 13/0091; B01J 21/063; B01J 21/08; B01J 31/122; B01J 35/004; B01J 35/023; B01J 35/1019; B01J 35/1023; B01J 35/1028; B01J 37/0009; B01J 37/0236; B01J 37/038; C01B 33/1585; C01B 33/159; C01G 23/047; C01G 23/053
See application file for complete search history.

(56) References Cited

U.S. PATENT DOCUMENTS

| 8,354,358 B2 | 1/2013 | Kayama et al. |
| 2008/0112880 A1 | 5/2008 | Kayama et al. |
| 2019/0076808 A1 | 3/2019 | Kadokura et al. |

FOREIGN PATENT DOCUMENTS

| JP | 2003-170061 A | 6/2003 |
| JP | 2005-034254 A | 2/2005 |
| JP | 2005-169298 A | 6/2005 |
| JP | 2006-247524 A | 9/2006 |
| JP | 2006-281155 A | 10/2006 |
| JP | 2009-131760 A | 6/2009 |
| JP | 2011-057552 A | 3/2011 |
| JP | 2015-116526 A | 6/2015 |
| JP | 2015-142917 A | 8/2015 |
| JP | 2016-064407 A | 4/2016 |
| JP | 2016-221447 A | 12/2016 |
| JP | 2017-035645 A | 2/2017 |

OTHER PUBLICATIONS

U.S Appl. No. 15/988,495 (Year: 2019).*
Oct. 4, 2019 Office Action Issued in U.S. Appl. No. 15/988,495.
Apr. 17, 2020 Office Action issued U.S. Appl. No. 15/988,495.
Wang et al., "Influences of Heat-Treatment on the Microstructure and Properties of Silica-Titania Composite Aerogels", Journal of Porous Materials, (2014), vol. 21, pp. 293-301.

* cited by examiner

Primary Examiner — Edward J Cain
(74) Attorney, Agent, or Firm — Oliff PLC

(57) ABSTRACT

A silica-titania composite aerogel particle includes: a base particle including silicon and titanium whose element ratio Si/Ti is more than 0 and 6 or less; and a surface layer present on the base particle and including a metal compound having a metal atom and a hydrocarbon group. The silica-titania composite aerogel particle has absorption at wavelengths of 450 nm and 750 nm in a visible absorption spectrum, has a BET specific surface area in the range of 200 $m^2/g$ to 1,200 $m^2/g$, and has a value A in the range of 0.03 to 0.3. The value A is calculated by formula: A=(peak intensity of C—O bond+peak intensity of C=O bond)/(peak intensity of C—C bond+peak intensity of C=C bond). The peak intensity is obtained from a C 1s XPS spectrum.

17 Claims, 2 Drawing Sheets

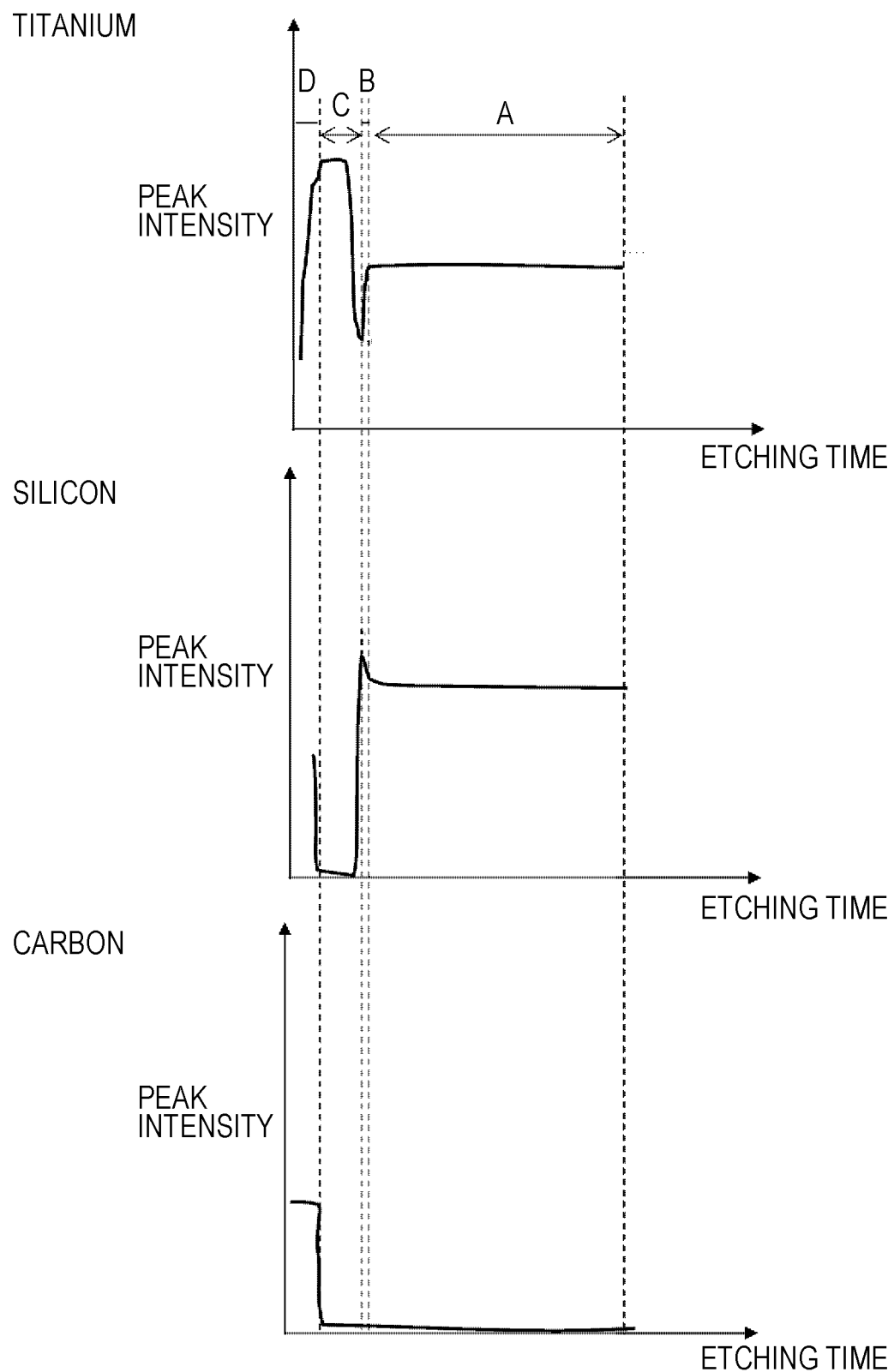

SILICA-TITANIA COMPOSITE AEROGEL PARTICLE, PHOTOCATALYST-FORMING COMPOSITION, AND PHOTOCATALYST

CROSS-REFERENCE TO RELATED APPLICATIONS

This application is based on and claims priority under 35 USC 119 from Japanese Patent Application No. 2017-174872 filed Sep. 12, 2017.

BACKGROUND

Technical Field

The present invention relates to a silica-titania composite aerogel particle, a photocatalyst-forming composition, and a photocatalyst.

SUMMARY

According to an aspect of the invention, there is provided a silica-titania composite aerogel particle including a base particle that includes silicon and titanium whose element ratio Si/Ti is more than 0 and 6 or less, and a surface layer that is present on the base particle and includes a metal compound having a metal atom and a hydrocarbon group. The silica-titania composite aerogel particle has absorption at wavelengths of 450 nm and 750 nm in a visible absorption spectrum, has a BET specific surface area in the range of 200 $m^2/g$ to 1,200 $m^2/g$, and has a value A in the range of 0.03 to 0.3. The value A is calculated by formula: A=(peak intensity of C—O bond+peak intensity of C=O bond)/(peak intensity of C—C bond+peak intensity of C=C bond). In the formula, the peak intensity is a value obtained from a C is XPS spectrum.

BRIEF DESCRIPTION OF THE DRAWINGS

An exemplary embodiment of the present invention will be described in detail based on the following figures, wherein:

FIG. 2 shows exemplary elemental profiles of the silica-titania composite aerogel particle of the exemplary embodiment.

DETAILED DESCRIPTION

Figure 1:
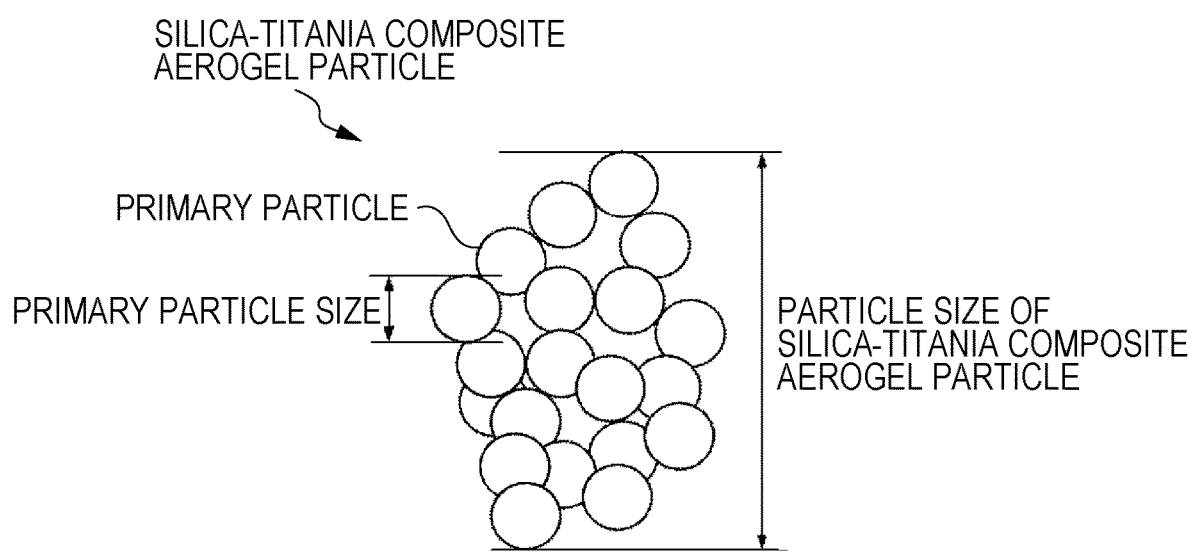
FIG. 1 is a schematic view of a silica-titania composite aerogel particle of an exemplary embodiment.

An exemplary embodiment of the invention will now be described. The description and examples below are illustrative of the exemplary embodiment and are not intended to limit the scope of the invention.

In the present disclosure, if there are two or more substances corresponding to one component in a composition, the amount of the component in the composition refers to the total amount of the two or more substances in the composition, unless otherwise specified.

In the present disclosure, the term "step" encompasses not only a separate step but also a step that is not clearly distinguished from another step if the desired object of the step is achieved.

XPS is the abbreviation for X-ray photoelectron spectroscopy.

Silica-Titania Composite Aerogel Particle

A silica-titania composite aerogel particle of the exemplary embodiment includes a base particle that includes silicon and titanium whose element ratio Si/Ti is more than 0 and 6 or less, and a surface layer that is present on the base particle and includes a metal compound having a metal atom and a hydrocarbon group. The silica-titania composite aerogel particle of the exemplary embodiment satisfies (peak intensity of C—O bond+peak intensity of C=O bond)/(peak intensity of C—C bond+peak intensity of C=C bond)=0.03 to 0.3 in a C is XPS spectrum, has a BET specific surface area of 200 $m^2/g$ or more and 1,200 $m^2/g$ or less, and has absorption at wavelengths of 450 nm and 750 nm in a visible absorption spectrum.

The silica-titania composite aerogel particle of the exemplary embodiment may be a particle including a base particle and a surface layer or may be a particle having an intermediate layer described below between the base particle and the surface layer. In the silica-titania composite aerogel particle of the exemplary embodiment, at least the base particle has an aerogel structure. In the exemplary embodiment, the term "aerogel" or "aerogel structure" refers to a structure in which primary particles are aggregated while forming a porous structure. The "aerogel" or "aerogel structure" has a cluster structure formed of gathered spheroids having diameters on the order of nanometers, and the inner structure of the "aerogel" or "aerogel structure" is a three-dimensional network microstructure.

FIG. 1 schematically shows an exemplary structure of the silica-titania composite aerogel particle of the exemplary embodiment (the layer present on the base particle is omitted). The silica-titania composite aerogel particle shown in FIG. 1 is an aggregate particle (base particle) in which primary particles are aggregated while forming a porous structure.

The silica-titania composite aerogel particle of the exemplary embodiment has absorption at wavelengths of 450 nm and 750 nm in a visible absorption spectrum, that is, exhibits visible light responsivity. Presumably, this is due to the following combined reasons: the silica-titania composite aerogel particle has a surface area that is large for its particle size due to the porous structure having numbers of pores or voids in the particle (i.e., the BET specific surface area is 200 $m^2/g$ or more and 1,200 $m^2/g$ or less); the element ratio Si/Ti in the base particle is more than 0 and 6 or less; the silica-titania composite aerogel particle has the surface layer including an organometallic compound on the base particle; and an XPS peak intensity ratio of C is 0.03 or more and 0.3 or less. The silica-titania composite aerogel particle of the exemplary embodiment has an excellent photocatalytic function. Presumably, this is not simply because the specific surface area is large but also because the porous structure facilitates the trapping of objects to be decomposed.

In the silica-titania composite aerogel particle of the exemplary embodiment, the element ratio of silicon to titanium, Si/Ti, in the base particle is more than 0 and 6 or less. When the element ratio Si/Ti in the base particle is more than 0, silica enters a titania skeleton to promote pore formation in the silica-titania aerogel particle, and the large specific surface area facilitates the adsorption of objects to be photodecomposed, as a result of which the silica-titania composite aerogel particle tends to exhibit a photocatalytic function in the visible range. When the element ratio Si/Ti in the base particle is 6 or less, a photocatalytic effect due to the titania skeleton in the silica-titania composite aerogel particle is exhibited, as a result of which the silica-titania composite aerogel particle tends to exhibit a photocatalytic function not only in the UV range but also in the visible range.

In view of the above, the element ratio Si/Ti in the base particle is more than 0 and 6 or less, more preferably 0.05 or more and 4 or less, still more preferably 0.1 or more and 3 or less.

The element ratio Si/Ti of silicon and titanium in the base particle is determined by performing an XPS qualitative analysis (wide scan analysis) and creating an elemental profile of the silica-titania composite aerogel particle. A detailed measuring method is as described in EXAMPLES below.

The silica-titania composite aerogel particle of the exemplary embodiment satisfies (peak intensity of C—O bond+peak intensity of C═O bond)/(peak intensity of C—C bond+peak intensity of C═C bond)=0.03 to 0.3 in a C is XPS spectrum.

In the present disclosure, (peak intensity of C—O bond+peak intensity of C═O bond)/(peak intensity of C—C bond+peak intensity of C═C bond) in a C is XPS spectrum is referred to as an "XPS peak intensity ratio of C is". The XPS peak intensity ratio of C is indicates the degree of oxidation of the surface of the silica-titania composite aerogel particle.

Although the mechanism is not fully understood, it is presumed that since an organometallic compound in which hydrocarbon groups are adequately oxidized is present on the surface of the silica-titania composite aerogel particle, the surface of the silica-titania composite aerogel particle exhibits light absorption at wavelengths of 450 nm and 750 nm, and as a result, the silica-titania composite aerogel particle exhibits a photocatalytic function also in the visible range.

Presumably, when the XPS peak intensity ratio of C is is less than 0.03, the degree of oxidation of hydrocarbon groups in the organometallic compound is excessively low, and the surface of the silica-titania composite aerogel particle is less likely to exhibit light absorption in the visible range. An XPS peak intensity ratio of C is of more than 0.3 means that a treatment (e.g., a heat treatment) for oxidizing some hydrocarbon groups in the organometallic compound has proceeded too vigorously, and it is presumed that the hydrocarbon groups have not only been oxidized but also eliminated and that the surface of the silica-titania composite aerogel particle does not exhibit sufficient light absorption in the visible range.

In view of the above, the XPS peak intensity ratio of C is of the silica-titania composite aerogel particle is 0.03 or more and 0.3 or less, more preferably 0.04 or more and 0.25 or less, still more preferably 0.05 or more and 0.2 or less.

The XPS peak intensity ratio of C is of the silica-titania composite aerogel particle is determined from an XPS spectrum. In a C is XPS spectrum, multiple peaks appear according to the state of bonding of carbon atoms, and the peaks are each assigned according to their chemical shift position. In the exemplary embodiment, a peak that appears in the range of 285.5 eV to 287 eV is determined to be a peak of a C—O bond, a peak that appears in the range of 287 eV to 288 eV to be a peak of a C═O bond, a peak that appears in the range of 284 eV to 285.5 eV to be a peak of a C—C bond, and a peak that appears in the range of 284.5 eV to 285 eV to be a peak of a C═C bond. Here, the peak of a C—O bond and the peak of a C═O bond need not necessarily be separated from each other, and the peak of a C—C bond and the peak of a C═C bond need not necessarily be separated from each other. (Peak intensity of C—O bond+peak intensity of C═O bond)/(peak intensity of C—C bond+peak intensity of C═C bond) is determined using either the peak of a C—O bond or the peak of a C═O bond, whichever is higher, as (peak intensity of C—O bond+peak intensity of C═O bond) and either the peak of a C—C bond or the peak of a C═C bond, whichever is higher, as (peak intensity of C—C bond+peak intensity of C═C bond). A detailed measuring method is as described in EXAMPLES below.

The silica-titania composite aerogel particle of the exemplary embodiment has a BET specific surface area of 200 $m^2/g$ or more and 1,200 $m^2/g$ or less. When the BET specific surface area is 200 $m^2/g$ or more, the surface area is large relative to the amount, and the area that may adsorb objects to be photodecomposed is large, which facilitates the adsorption of objects to be photodecomposed, leading to an increased photocatalytic function. When the BET specific surface area is 1,200 $m^2/g$ or less, the proportion of coarse particles (particles having particle sizes of more than 20 μm) is small, which improves the particle dispersibility in a photocatalyst-forming composition, a photocatalyst, or a structure described below and thus allows a high photocatalytic function to be readily exhibited. For the above reasons, when the BET specific surface area of the silica-titania composite aerogel particle is in the above range, a high photocatalytic function is readily exhibited in the visible range.

In view of the above, the BET specific surface area of the silica-titania composite aerogel particle is 200 $m^2/g$ or more and 1,200 $m^2/g$ or less, more preferably 300 $m^2/g$ or more and 1,100 $m^2/g$ or less, still more preferably 400 $m^2/g$ or more and 1,000 $m^2/g$ or less.

The BET specific surface area of the silica-titania composite aerogel particle is determined by gas adsorption using nitrogen gas. A detailed measuring method is as described in EXAMPLES below.

The silica-titania composite aerogel particles of the exemplary embodiment preferably have a volume average particle size of 0.1 μm or more and 3 μm or less. When the volume average particle size is 0.1 μm or more, a porous structure is readily formed, which leads to a large specific surface area and thus facilitates the adsorption of objects to be photodecomposed. As a result, a high photocatalytic effect is readily exhibited. When the volume average particle size is 3 μm or less, the amount of coarse particles (particles having particle sizes of more than 20 μm) is small, which improves the dispersibility of the silica-titania composite aerogel particles in a photocatalyst-forming composition, a photocatalyst, or a structure described below, leading to an increased photocatalytic function. For the above reasons, when the volume average particle size of the silica-titania composite aerogel particles is in the above range, a high photocatalytic function is readily exhibited in the visible range.

In view of the above, the volume average particle size of the silica-titania composite aerogel particles is preferably 0.1 μm or more and 3 μm or less, more preferably 0.3 μm or more and 2.8 μm or less, still more preferably 0.4 μm or more and 2.5 μm or less.

When the silica-titania composite aerogel particle includes a base particle and a surface layer, their entire particle size is the particle size of the silica-titania composite aerogel particle. When the silica-titania composite aerogel particle includes a base particle, an intermediate layer, and a surface layer, their entire particle size is the particle size of the silica-titania composite aerogel particle.

The volume average particle size of the silica-titania composite aerogel particles is a particle size at which the cumulative volume is 50% from smaller particle sizes in a volume-based particle size distribution.

The silica-titania composite aerogel particles of the exemplary embodiment preferably have a volume particle size distribution of 1.5 or more and 10 or less. When the volume particle size distribution is 1.5 or more, a porous structure is readily formed, which leads to a large specific surface area and thus facilitates the adsorption of objects to be photodecomposed. As a result, a high photocatalytic effect is readily exhibited. When the volume particle size distribution is 10 or less, the amount of coarse particles (particles having particle sizes of more than 20 µm) is small, which improves the dispersibility of the silica-titania composite aerogel particles in a photocatalyst-forming composition, a photocatalyst, or a structure described below, leading to an increased photocatalytic function. For the above reasons, when the volume particle size distribution of the silica-titania composite aerogel particles is in the above range, a high photocatalytic function is readily exhibited in the visible range.

In view of the above, the volume particle size distribution of the silica-titania composite aerogel particles is preferably 1.5 or more and 10 or less, more preferably 1.7 or more and 5 or less, still more preferably 2 or more and 4 or less.

In the exemplary embodiment, the volume particle size distribution of the silica-titania composite aerogel particles is defined as $(D90 \text{ v}/D10 \text{ v})^{1/2}$. D90 v is a particle size at which the cumulative volume is 90% from smaller particle sizes in a volume-based particle size distribution, and D10 v is a particle size at which the cumulative volume is 10% from smaller particle sizes in the volume-based particle size distribution.

For the silica-titania composite aerogel particle of the exemplary embodiment to exhibit a high photocatalytic function also in the visible range, the base particle is preferably an aggregate particle in which primary particles are aggregated while forming a porous structure, and the average size of the primary particles (average primary particle size) is preferably 1 nm or more and 90 nm or less. When the average size of the primary particles is 1 nm or more, the pore size at the surface of the aggregate particle (base particle) is appropriate, which facilitates the adsorption of objects to be photodecomposed, and as a result, a high photocatalytic function in the visible range is readily exhibited. When the average size of the primary particles is 90 nm or less, the primary particles are readily aggregated while forming a porous structure, and the aggregate particle (base particle) tends to exhibit a high photocatalytic function in the visible range.

In view of the above, the average size of the primary particles is preferably 1 nm or more and 90 nm or less, more preferably 5 nm or more and 80 nm or less, still more preferably 10 nm or more and 70 nm or less.

Methods of measuring the volume average particle size and the volume particle size distribution of the silica-titania composite aerogel particles and a method of measuring the average size of the primary particles constituting the base particle of the silica-titania composite aerogel particle will be described in EXAMPLES below.

The silica-titania composite aerogel particle of the exemplary embodiment has absorption at wavelengths of 450 nm and 750 nm in a visible absorption spectrum.

To exhibit a high photocatalytic function also in the visible range, the silica-titania composite aerogel particle of the exemplary embodiment preferably has absorption at wavelengths of 450 nm, 600 nm, and 750 nm in a visible absorption spectrum, more preferably has absorption over the entire wavelength range of 450 nm to 750 nm in the visible absorption spectrum, and particularly preferably has absorption over the entire wavelength range of 400 nm to 800 nm in the visible absorption spectrum.

To exhibit a high photocatalytic function also in the visible range, the silica-titania composite aerogel particle of the exemplary embodiment preferably has, in an ultraviolet-visible absorption spectrum, an absorbance of 0.02 or more (more preferably 0.1 or more, still more preferably 0.2 or more) at a wavelength of 450 nm, an absorbance of 0.02 or more (more preferably 0.1 or more, still more preferably 0.2 or more) at a wavelength of 600 nm, and an absorbance of 0.02 or more (more preferably 0.1 or more, still more preferably 0.2 or more) at a wavelength of 750 nm, the absorbance values being relative to the absorbance at a wavelength of 350 nm taken as 1.

The ultraviolet-visible absorption spectrum of the silica-titania composite aerogel particle is obtained by measuring a diffuse reflectance spectrum in the wavelength range of 200 nm to 900 nm and theoretically determining the absorbance at each wavelength by Kubelka-Munk conversion from the diffuse reflectance spectrum. A detailed measuring method is as described in EXAMPLES below.

The silica-titania composite aerogel particle of the exemplary embodiment has, on the base particle, the surface layer including a metal compound having a metal atom and a hydrocarbon group. The silica-titania composite aerogel particle having the surface layer exhibits a higher photocatalytic function in the visible range than a silica-titania composite aerogel particle having no surface layer. The surface layer is preferably covalently bonded to the base particle or an intermediate layer.

The silica-titania composite aerogel particle of the exemplary embodiment may further have an intermediate layer made of titania between the base particle and the surface layer. The silica-titania composite aerogel particle having the intermediate layer more readily exhibits visible light responsivity than a silica-titania composite aerogel particle having no intermediate layer. In producing the base particle including a silica-titania composite, silica is more likely to appear on the surface of the base particle than titania. However, it is presumed that the intermediate layer made of titania provided on the surface of the base particle allows the surface of the silica-titania composite aerogel particle to more readily exhibit visible light responsivity.

The presence of the surface layer and the presence of the intermediate layer in the silica-titania composite aerogel particle are determined in the following manner.

An XPS qualitative analysis (wide scan analysis) is performed while etching the surface of the silica-titania composite aerogel particle in the depth direction using noble gas ions, thereby identifying and quantifying at least titanium, silicon, and carbon. Using the data obtained, elemental profiles of at least titanium, silicon, and carbon are each drawn with peak intensity plotted on the vertical axis and etching time on the horizontal axis. Each profile curve is divided into multiple regions at inflection points to determine a region that reflects the elementary composition of the base particle, a region that reflects the elementary composition of the intermediate layer, and a region that reflects the elementary composition of the surface layer. When a region that reflects the elementary composition of the intermediate layer exists in the elemental profiles, the silica-titania composite aerogel particle is determined to have the intermediate layer. When a region that reflects the elementary composition of the surface layer exists in the elemental profiles, the silica-titania composite aerogel particle is determined to have the surface layer.

A description will be made with reference to FIG. 2.

FIG. 2 shows exemplary elemental profiles of the silica-titania composite aerogel particle: an elemental profile of titanium, an elemental profile of silicon, and an elemental profile of carbon, from the top.

The elemental profiles shown in FIG. 2 are each divided into a region A, a region B, a region C, and a region D at inflection points of each profile curve.

Region A: a region at the final stage of etching, where the peak intensity of titanium and the peak intensity of silicon are substantially constant.

Region B: a region immediately before region A, where the peak intensity of titanium decreases and the peak intensity of silicon increases toward the particle surface side.

Region C: a region immediately before region B, where the peak intensity of titanium is substantially constant and silicon is hardly detected.

Region D: a region at the early stage of etching, where the peak intensity of carbon is substantially constant and the metal elements are also detected.

Region A and region B are regions that reflect the elementary composition of the base particle. In producing the base particle, silica and titania form covalent bonds according to the mixing ratio of an alkoxysilane to a titanium alkoxide, which are materials for a silica-titania composite, thereby forming the base particle. However, silica is more likely to appear on the surface of the base particle than titania. Consequently, in the elemental profiles, region A where the peak intensity of titanium and the peak intensity of silicon are substantially constant appears at the final stage of etching, and region B where the peak intensity of titanium decreases and the peak intensity of silicon increases toward the particle surface side appears immediately before region A.

Region C is a region that reflects the elementary composition of the intermediate layer. When region C, i.e., a region where the peak intensity of titanium is substantially constant and silicon is hardly detected exists immediately before region B, the silica-titania composite aerogel particle is determined to have the intermediate layer which is a "layer made of titania".

Region C, while being a region that reflects the elementary composition of the intermediate layer, does not necessarily completely correspond to the intermediate layer. The elementary composition of the base particle may be reflected on the side of region C near region B.

Region D is a region that reflects the elementary composition of the surface layer. When region D, i.e., a region where the peak intensity of carbon is substantially constant and the metal elements are also detected exists at the early stage of etching, the silica-titania composite aerogel particle is determined to have the surface layer which is a "layer including a metal compound having a metal atom and a hydrocarbon group".

Examples of the metal atom constituting the metal compound in the surface layer include silicon, aluminum, and titanium. Accordingly, aluminum is also identified and quantified by XPS and an elemental profile of aluminum is also drawn, as required.

Region D, while being a region that reflects the elementary composition of the surface layer, does not necessarily completely correspond to the surface layer. The elementary composition of the intermediate layer or the elementary composition of the base particle may be reflected on the side of region D near region C.

From the elemental profiles shown in FIG. 2, it is determined that the silica-titania composite aerogel particle has the base particle, the intermediate layer, and the surface layer and that the metal atom constituting the metal compound in the surface layer is silicon.

The layer structure of the silica-titania composite aerogel particle of the exemplary embodiment will be further described below.

Base Particle

The base particle includes a silica-titania composite which is a composite oxide of silicon and titanium, and the element ratio of silicon to titanium, Si/Ti, is more than 0 and 6 or less.

To exhibit a photocatalytic function in the visible range, the element ratio of silicon to titanium, Si/Ti, in the base particle is more than 0 and 6 or less, more preferably 0.05 or more and 4 or less, still more preferably 0.1 or more and 3 or less.

To exhibit a high photocatalytic function, the BET specific surface area of the base particle is preferably 200 m$^2$/g or more and 1,200 m$^2$/g or less, more preferably 300 m$^2$/g or more and 1,100 m$^2$/g or less, still more preferably 400 m$^2$/g or more and 1,000 m$^2$/g or less.

To exhibit a high photocatalytic function, the volume average particle size of the base particles is preferably 0.1 μm or more and 3 μm or less, more preferably 0.3 μm or more and 2.8 μm or less, still more preferably 0.4 μm or more and 2.5 μm or less.

To exhibit a high photocatalytic function, the base particle is preferably an aggregate particle in which primary particles including a composite oxide of silicon and titanium are aggregated while forming a porous structure. In this case, the average size of the primary particles constituting the base particle is preferably 1 nm or more and 90 nm or less, more preferably 5 nm or more and 80 nm or less, still more preferably 10 nm or more and 70 nm or less.

The base particle may be produced by any method. To control the BET specific surface area to be in the above range, the base particle is preferably produced by a sol-gel process using an alkoxysilane and a titanium alkoxide as materials. A base particle produced by the sol-gel process, in a dispersion, takes the form of a secondary particle having a porous structure in which primary particles are aggregated and thus achieves a BET specific surface area in the above range.

The base particle is preferably formed of a hydrolysis condensate of an alkoxysilane and a titanium alkoxide. However, some hydrocarbon groups, such as alkoxy groups, of the alkoxysilane or the titanium alkoxide may remain unreacted and be left behind in the base particle.

The total content of silica components and titania components in the base particle is preferably 80% by mass or more, more preferably 90% by mass or more, still more preferably 95% by mass or more, relative to the total mass of the base particle.

Intermediate Layer

The intermediate layer is made of titania.

To more readily exhibit visible light responsivity, the intermediate layer more preferably includes titania covalently bonded to the surface of the base particle.

The state of interatomic chemical bonding in the intermediate layer may be determined by performing an XPS high resolution analysis (narrow scan analysis).

The thickness of the intermediate layer is preferably 0.1 nm or more and 30 nm or less, more preferably 0.2 nm or more and 10 nm or less, still more preferably 0.3 nm or more and 5 nm or less. The thickness of the intermediate layer is a value converted from an etching time of region C determined in the profile curves described above.

The intermediate layer may be formed by any method but is preferably formed on the surface of the base particle by a sol-gel process using a titanium alkoxide as a material. A detailed formation method will be described later.

The intermediate layer is preferably formed of a hydrolysis condensate of a titanium alkoxide. However, some hydrocarbon groups, such as alkoxy groups, of the titanium alkoxide may remain unreacted and be left behind in the intermediate layer.

The intermediate layer may include a small amount of metal elements other than titanium, such as silicon and aluminum. When the intermediate layer includes silicon, a silicon content in the range where the element ratio of silicon to titanium, Si/Ti, is 0 or more and 0.05 or less has no influence on the silica-titania composite aerogel particle exhibiting a high photocatalytic function in the visible range.

Surface Layer

The surface layer includes a metal compound having a metal atom and a hydrocarbon group. In the present disclosure, the metal compound having a metal atom and a hydrocarbon group is also referred to as an "organometallic compound". To more readily exhibit visible light responsivity, the organometallic compound preferably includes metal, carbon, hydrogen, and oxygen atoms alone.

To more readily exhibit visible light responsivity, the surface layer preferably includes an organometallic compound bonded to the base particle or the intermediate layer through an oxygen atom. To more readily exhibit visible light responsivity, the organometallic compound is preferably bonded to the base particle or the intermediate layer through an oxygen atom O directly bonded to a metal atom M in the organometallic compound, that is, via a covalent bond M-O—Ti or M-O—Si.

To more readily exhibit visible light responsivity, the organometallic compound included in the surface layer preferably has a metal atom M and a hydrocarbon group directly bonded to the metal atom M. The organometallic compound is preferably bonded to the base particle or the intermediate layer through an oxygen atom O directly bonded to the metal atom M in the organometallic compound. That is, to more readily exhibit visible light responsivity, a structure in which the hydrocarbon group, the metal atom M, the oxygen atom O, and a titanium atom Ti or a silicon atom Si are linked in this order through covalent bonds (hydrocarbon group-M-O—Ti or hydrocarbon group-M-O—Si) is preferably present on the surface of the silica-titania composite aerogel particle.

The state of interatomic chemical bonding in the surface layer may be determined by performing an XPS high resolution analysis (narrow scan analysis).

To more readily exhibit visible light responsivity, the metal atom constituting the organometallic compound included in the surface layer is preferably silicon, aluminum, or titanium, more preferably silicon or aluminum, particularly preferably silicon.

Examples of the hydrocarbon group of the organometallic compound include saturated and unsaturated aliphatic hydrocarbon groups of 1 to 40 carbon atoms (preferably 1 to 20 carbon atoms, more preferably 1 to 18 carbon atoms, still more preferably 4 to 12 carbon atoms, yet still more preferably 4 to 10 carbon atoms) and aromatic hydrocarbon groups of 6 to 27 carbon atoms (preferably 6 to 20 carbon atoms, more preferably 6 to 18 carbon atoms, still more preferably 6 to 12 carbon atoms, yet still more preferably 6 to 10 carbon atoms).

To exhibit a high photocatalytic function and improve the dispersibility, the hydrocarbon group of the organometallic compound is preferably an aliphatic hydrocarbon group, more preferably a saturated aliphatic hydrocarbon group, particularly preferably an alkyl group. The aliphatic hydrocarbon group may be linear, branched, or cyclic, and is preferably linear or branched from the viewpoint of dispersibility. The number of carbon atoms in the aliphatic hydrocarbon group is preferably 1 to 20, more preferably 1 to 18, still more preferably 4 to 12, yet still more preferably 4 to 10.

Examples of the saturated aliphatic hydrocarbon group of the organometallic compound include linear alkyl groups (e.g., methyl, ethyl, propyl, butyl, pentyl, hexyl, heptyl, octyl, nonyl, decyl, dodecyl, hexadecyl, and icosyl groups), branched alkyl groups (e.g., isopropyl, isobutyl, isopentyl, neopentyl, 2-ethylhexyl, tertiary butyl, tertiary pentyl, and isopentadecyl groups), and cyclic alkyl groups (e.g., cyclopropyl, cyclopentyl, cyclohexyl, cycloheptyl, cyclooctyl, tricyclodecyl, norbornyl, and adamantyl groups).

Examples of the unsaturated aliphatic hydrocarbon group of the organometallic compound include alkenyl groups (e.g., vinyl (ethenyl), 1-propenyl, 2-propenyl, 2-butenyl, 1-butenyl, 1-hexenyl, 2-dodecenyl, and pentenyl groups) and alkynyl groups (e.g., ethynyl, 1-propynyl, 2-propynyl, 1-butynyl, 3-hexynyl, and 2-dodecynyl groups).

The aliphatic hydrocarbon group of the organometallic compound may be a substituted aliphatic hydrocarbon group. Examples of the substituent for the aliphatic hydrocarbon group include halogen atoms and epoxy, glycidyl, glycidoxy, mercapto, methacryloyl, and acryloyl groups.

Examples of the aromatic hydrocarbon group of the organometallic compound include phenylene, biphenylene, terphenylene, naphthalene, and anthracene groups.

The aromatic hydrocarbon group of the organometallic compound may be a substituted aromatic hydrocarbon group. Examples of the substituent for the aromatic hydrocarbon group include halogen atoms and epoxy, glycidyl, glycidoxy, mercapto, methacryloyl, and acryloyl groups.

The organometallic compound included in the surface layer is derived from an organometallic compound used in a surface treatment step described below, for example.

The silica-titania composite aerogel particle having the surface layer is favored for its high photocatalytic function in the visible range and also for the following reason.

In general, silica-titania composite aerogel particles have poor dispersibility in a resin or a solvent and thus tend to provide a coating having low uniformity and to be less likely to exhibit a photocatalytic function.

In contrast, the silica-titania composite aerogel particles having the surface layer have on their surface hydrocarbon groups derived from the organometallic compound and thus have good dispersibility in a resin or a solvent. This enables the formation of a substantially uniform coating, allows the silica-titania composite aerogel particles to be efficiently exposed to light, and allows the photocatalytic function to be readily exhibited. When a paint containing the silica-titania composite aerogel particles is applied to a surface of, for example, an external wall material, a board, a pipe, or a nonwoven fabric, the aggregation of the silica-titania composite aerogel particles or coating defects are suppressed, and the photocatalytic function tends to be exhibited over a long period of time.

The thickness of the surface layer is preferably 0.1 nm or more and 30 nm or less, more preferably 0.2 nm or more and 10 nm or less, still more preferably 0.3 nm or more and 5 nm or less. The thickness of the surface layer is a value converted from an etching time of region D determined in the profile curves described above.

Method for Producing Silica-Titania Composite Aerogel Particle

The silica-titania composite aerogel particle of the exemplary embodiment may be produced by any method. For example, the silica-titania composite aerogel particle is obtained by preparing porous particles including a silica-titania composite using a sol-gel process and surface-treating the porous particles with an organometallic compound. In this case, the surface-treated porous particles are preferably heat-treated to thereby produce the silica-titania composite aerogel particle of the exemplary embodiment.

An exemplary method for producing the silica-titania composite aerogel particle of the exemplary embodiment will now be described.

A method for producing the silica-titania composite aerogel particle of the exemplary embodiment includes at least (1), (2), and (3) below and preferably further includes (4).

(1) A step of granulating porous particles including a silica-titania composite by a sol-gel process and preparing a dispersion containing the porous particles and a solvent (dispersion preparation step).

(2) A step of removing the solvent from the dispersion by using supercritical carbon dioxide (solvent removal step).

(3) A step of, after removing the solvent, surface-treating the porous particles with a metal compound having a metal atom and a hydrocarbon group (surface treatment step). Preferably, a step of, after removing the solvent, surface-treating the porous particles with a metal compound having a metal atom and a hydrocarbon group in supercritical carbon dioxide.

(4) A step of heat-treating the surface-treated porous particles (heat treatment step).

(1) Dispersion Preparation Step

The dispersion preparation step is, for example, a step of forming a silica-titania composite by causing a reaction (hydrolysis and condensation) between an alkoxysilane and a titanium alkoxide which are used as materials, thereby preparing a dispersion of silica-titania-composite-containing porous particles in a solvent. The porous particles are preferably aggregate particles in each of which primary particles including the silica-titania composite are aggregated while forming a porous structure.

Specifically, the dispersion preparation step is, for example, a step described below.

An alkoxysilane and a titanium alkoxide are added to an alcohol, and an aqueous acid solution is added dropwise thereto with stirring so as to cause a reaction between the alkoxysilane and the titanium alkoxide to form a silica-titania composite, thereby preparing a dispersion of silica-titania-composite-containing porous particles in alcohol.

To form an intermediate layer on a base particle surface, the dispersion preparation step includes the following two steps, for example. When the intermediate layer is not formed on the base particle surface, the dispersion preparation step includes (i) alone.

(i) An alkoxysilane and a titanium alkoxide are added to an alcohol, and an aqueous acid solution is added dropwise thereto with stirring so as to cause a reaction between the alkoxysilane and the titanium alkoxide to form a silica-titania composite, thereby preparing a dispersion (first dispersion) of silica-titania-composite-containing base particles in alcohol. The base particles are preferably aggregate particles in each of which primary particles including the silica-titania composite are aggregated while forming a porous structure.

(ii) A mixed solution of a titanium alkoxide in an alcohol is added dropwise to the first dispersion with stirring so as to cause a reaction between the base particles and the titanium alkoxide to form porous particles in each of which an intermediate layer is formed on the base particle surface, thereby preparing a dispersion (second dispersion) of the porous particles in alcohol.

By controlling the mixing ratio of the alkoxysilane to the titanium alkoxide in (i), the element ratio of silicon to titanium, Si/Ti, in the base particle may be controlled.

The particle size of the primary particles constituting the base particle and the particle size of the base particle may be controlled by controlling the total amount of alkoxysilane and titanium alkoxide relative to the amount of alcohol in (i). As the total amount relative to the amount of alcohol increases, the particle size of the primary particles constituting the base particle decreases and the particle size of the base particle increases. The total amount of alkoxysilane and titanium alkoxide is preferably 4 parts by mass or more and 250 parts by mass or less, more preferably 10 parts by mass or more and 50 parts by mass or less, relative to 100 parts by mass of alcohol.

Examples of the alkoxysilane for use in (i) include tetraalkoxysilanes, such as tetramethoxysilane, tetraethoxysilane, tetrapropoxysilane, and tetrabutoxysilane; alkyltrialkoxysilanes, such as methyltrimethoxysilane, methyltriethoxysilane, and ethyltriethoxysilane; and alkyldialkoxysilanes, such as dimethyldimethoxysilane and dimethyldiethoxysilane. These may be used alone or in combination.

Examples of the titanium alkoxide for use in (i) and (ii) include tetraalkoxytitaniums, such as tetramethoxytitanium, tetraethoxytitanium, tetrapropoxytitanium, and tetrabutoxytitanium; and alkoxytitanium chelates in which some alkoxy groups are chelated, such as di-i-propoxy.bis(ethylacetoacetate) titanium and di-i-propoxy.bis(acetylacetonate) titanium. These may be used alone or in combination. The titanium alkoxide for use in (i) and the titanium alkoxide for use in (ii) may be the same or different.

Examples of the alcohol for use in (i) and (ii) include methanol, ethanol, propanol, and butanol. These may be used alone or in combination. The alcohol for use in (i) and the alcohol for use in (ii) may be the same or different.

Examples of the acid in the aqueous acid solution for use in (i) include oxalic acid, acetic acid, hydrochloric acid, and nitric acid. The acid concentration of the aqueous acid solution is preferably 0.001% by mass or more and 1% by mass or less, more preferably 0.005% by mass or more and 0.01% by mass or less.

The amount of aqueous acid solution added dropwise in (i) is preferably 0.001 part by mass or more and 0.1 part by mass or less, provided that the total amount of alkoxysilane and titanium alkoxide is 100 parts by mass.

The first dispersion obtained in (i) preferably has a solids concentration of 1% by mass or more and 30% by mass or less.

The second dispersion obtained in (ii) preferably has a solids concentration of 1% by mass or more and 30% by mass or less.

(2) Solvent Removal Step

The solvent removal step is a step of removing the solvent by bringing supercritical carbon dioxide into contact with the dispersion containing the porous particles and the solvent. Solvent removal using supercritical carbon dioxide, as compared to solvent removal by heating, is less likely to cause collapse or clogging of pores of the porous particles (particularly, aggregate particles in each of which primary particles are aggregated while forming a porous structure). By performing the solvent removal step in such a manner that the solvent is removed by using supercritical carbon dioxide, silica-titania composite aerogel particles having a BET specific surface area of 200 m²/g or more may be obtained.

Specifically, the solvent removal step is performed according to the following procedure, for example.

The porous particle dispersion is placed into a sealed reactor, and then liquefied carbon dioxide is introduced thereinto, after which the sealed reactor is heated while increasing the pressure inside the sealed reactor by using a high-pressure pump, thereby bringing the carbon dioxide in the sealed reactor into a supercritical state. Liquefied carbon dioxide is then flowed into the sealed reactor to make the supercritical carbon dioxide flow out of the sealed reactor. In this manner, the supercritical carbon dioxide is flowed through the porous particle dispersion in the sealed reactor. While the supercritical carbon dioxide flows through the porous particle dispersion, the solvent dissolves in the supercritical carbon dioxide, and the solvent is removed together with the supercritical carbon dioxide flowing out of the sealed reactor.

The temperature and pressure in the sealed reactor are set to a temperature and pressure that brings carbon dioxide into a supercritical state. Since the critical point of carbon dioxide is 31.1° C./7.38 MPa, the temperature is set to 50° C. or higher and 200° C. or lower, and the pressure is set to 10 MPa or more and 30 MPa or less, for example.

(3) Surface Treatment Step

The surface treatment step is a step of reacting a metal compound having a metal atom and a hydrocarbon group (also referred to as an "organometallic compound" in the present disclosure) with the surface of the porous particles. In the surface treatment step, a reactive group (e.g., a hydrolyzable group such as a halogeno group or an alkoxy group) in the organometallic compound reacts with a reactive group (e.g., a hydroxyl group) on the surface of the porous particles, whereby the porous particles are surface-treated. The surface treatment step may be performed in an ambient atmosphere or a nitrogen atmosphere. When the surface treatment step is performed in supercritical carbon dioxide, the organometallic compound reaches deep inside pores of the porous particles, and places deep inside the pores of the porous particles are surface-treated. Thus, the surface treatment step is preferably performed in supercritical carbon dioxide.

The surface treatment step is performed, for example, by mixing the organometallic compound with the porous particles with stirring in supercritical carbon dioxide to cause a reaction. Alternatively, the surface treatment step is performed, for example, by mixing the organometallic compound with a solvent to prepare a treatment liquid and mixing the porous particles with the treatment liquid with stirring in supercritical carbon dioxide. To retain the pore structure of the porous particles to provide a large specific surface area, the organometallic compound is preferably placed into supercritical carbon dioxide immediately after step (2) to cause a reaction between the organometallic compound and the surface of the porous particles in the supercritical carbon dioxide.

The temperature and pressure in the surface treatment step are set to a temperature and pressure that brings carbon dioxide into a supercritical state. For example, the surface treatment step is performed in an atmosphere at a temperature of 50° C. or higher and 200° C. or lower and a pressure of 10 MPa or more and 30 MPa or less. The stirring is continued preferably for 10 minutes or more and 24 hours or less, more preferably for 20 minutes or more and 120 minutes or less, still more preferably for 30 minutes or more and 90 minutes or less.

The organometallic compound for use in the surface treatment preferably has a metal atom and a hydrocarbon group directly bonded to the metal atom. When the organometallic compound has multiple hydrocarbon groups, at least one hydrocarbon group may directly be bonded to the metal atom in the organometallic compound.

The metal atom of the organometallic compound is preferably silicon, aluminum, or titanium, more preferably silicon or aluminum, particularly preferably silicon.

Examples of the hydrocarbon group of the organometallic compound include saturated and unsaturated aliphatic hydrocarbon groups of 1 to 40 carbon atoms (preferably 1 to 20 carbon atoms, more preferably 1 to 18 carbon atoms, still more preferably 4 to 12 carbon atoms, yet still more preferably 4 to 10 carbon atoms) and aromatic hydrocarbon groups of 6 to 27 carbon atoms (preferably 6 to 20 carbon atoms, more preferably 6 to 18 carbon atoms, still more preferably 6 to 12 carbon atoms, yet still more preferably 6 to 10 carbon atoms).

To exhibit a high photocatalytic function and improve the dispersibility, the hydrocarbon group of the organometallic compound is preferably an aliphatic hydrocarbon group, more preferably a saturated aliphatic hydrocarbon group, particularly preferably an alkyl group. The aliphatic hydrocarbon group may be linear, branched, or cyclic, and is preferably linear or branched from the viewpoint of dispersibility. The number of carbon atoms in the aliphatic hydrocarbon group is preferably 1 to 20, more preferably 1 to 18, still more preferably 4 to 12, yet still more preferably 4 to 10.

The organometallic compound is particularly preferably a silane compound having a hydrocarbon group. Examples of the silane compound having a hydrocarbon group include chlorosilane compounds, alkoxysilane compounds, and silazane compounds (e.g., hexamethyldisilazane).

To exhibit a high photocatalytic function and improve the dispersibility, the silane compound having a hydrocarbon group for use in the surface treatment is preferably a compound represented by formula (1): $R^1{}_n SiR^2{}_m$.

In formula (1): $R^1{}_n SiR^2{}_m$, represents a saturated or unsaturated aliphatic hydrocarbon group of 1 to 20 carbon atoms or an aromatic hydrocarbon group of 6 to 20 carbon atoms, $R^2$ represents a halogen atom or an alkoxy group, n represents an integer of 1 to 3, and m represents an integer of 1 to 3, provided that n+m=4. When n is an integer of 2 or 3, the plural $R^1$s may be the same group or different groups. When m is an integer of 2 or 3, the plural $R^2$s may be the same group or different groups.

The aliphatic hydrocarbon group represented by $R^1$ may be linear, branched, or cyclic, and is preferably linear or branched from the viewpoint of dispersibility. To exhibit a high photocatalytic function and improve the dispersibility, the number of carbon atoms in the aliphatic hydrocarbon group is preferably 1 to 20, more preferably 1 to 18, still more preferably 4 to 12, yet still more preferably 4 to 10. The aliphatic hydrocarbon group may be saturated or unsaturated. To exhibit a high photocatalytic function and improve the dispersibility, a saturated aliphatic hydrocarbon group is preferred, and an alkyl group is more preferred.

Examples of the saturated aliphatic hydrocarbon group include linear alkyl groups (e.g., methyl, ethyl, propyl, butyl, pentyl, hexyl, heptyl, octyl, nonyl, decyl, dodecyl, hexadecyl, and icosyl groups), branched alkyl groups (e.g., isopropyl, isobutyl, isopentyl, neopentyl, 2-ethylhexyl, tertiary butyl, tertiary pentyl, and isopentadecyl groups), and cyclic alkyl groups (e.g., cyclopropyl, cyclopentyl, cyclohexyl, cycloheptyl, cyclooctyl, tricyclodecyl, norbornyl, and adamantyl groups).

Examples of the unsaturated aliphatic hydrocarbon group include alkenyl groups (e.g., vinyl (ethenyl), 1-propenyl, 2-propenyl, 2-butenyl, 1-butenyl, 1-hexenyl, 2-dodecenyl, and pentenyl groups) and alkynyl groups (e.g., ethynyl, 1-propynyl, 2-propynyl, 1-butynyl, 3-hexynyl, and 2-dodecynyl groups).

The aliphatic hydrocarbon group may be a substituted aliphatic hydrocarbon group. Examples of the substituent for the aliphatic hydrocarbon group include halogen atoms and epoxy, glycidyl, glycidoxy, mercapto, methacryloyl, and acryloyl groups.

The aromatic hydrocarbon group represented by $R^1$ has preferably 6 to 20 carbon atoms, more preferably 6 to 18 carbon atoms, still more preferably 6 to 12 carbon atoms, yet still more preferably 6 to 10 carbon atoms.

Examples of the aromatic hydrocarbon group include phenylene, biphenylene, terphenylene, naphthalene, and anthracene groups.

The aromatic hydrocarbon group may be a substituted aromatic hydrocarbon group. Examples of the substituent for the aromatic hydrocarbon group include halogen atoms and epoxy, glycidyl, glycidoxy, mercapto, methacryloyl, and acryloyl groups.

Examples of the halogen atom represented by $R^2$ include fluorine, chlorine, bromine, and iodine. The halogen atom is preferably chlorine, bromine, or iodine.

Examples of the alkoxy group represented by $R^2$ include alkoxy groups of 1 to 10 (preferably 1 to 8, more preferably 3 to 8) carbon atoms. Examples of the alkoxy group include methoxy, ethoxy, isopropoxy, t-butoxy, n-butoxy, n-hexyloxy, 2-ethylhexyloxy, and 3,5,5-trimethylhexyloxy groups. The alkoxy group may be a substituted alkoxy group. Examples of the substituent for the alkoxy group include halogen atoms and hydroxyl, amino, alkoxy, amide, and carbonyl groups.

To exhibit a high photocatalytic function and improve the dispersibility, the compound represented by formula (1): $R^1_n SiR^2_m$ is preferably a compound with $R^1$ being a saturated aliphatic hydrocarbon group. In particular, the compound represented by formula (1): $R^1_n SiR^2_m$ is preferably a compound with $R^1$ being a saturated aliphatic hydrocarbon group of 1 to 20 carbon atoms, $R^2$ being a halogen atom or an alkoxy group, n being an integer of 1 to 3, and m being an integer of 1 to 3, provided that n+m=4.

Examples of the compound represented by formula (1): $R^1_n SiR^2_m$ include silane compounds, such as:

vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane (n=1, m=3);

dimethyldimethoxysilane, dimethyldiethoxysilane, methylvinyldimethoxysilane, methylvinyldiethoxysilane, diphenyldimethoxysilane, diphenyldiethoxysilane, dimethyldichlorosilane, and dichlorodiphenylsilane (n=2, m=2);

trimethylmethoxysilane, trimethylethoxysilane, trimethylchlorosilane, decyldimethylchlorosilane, and triphenylchlorosilane (n=3, m=1); and 3-glycidoxypropyltrimethoxysilane, γ-methacryloxypropyltrimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl)aminopropylmethyldimethoxysilane, and γ-glycidyloxypropylmethyldimethoxysilane (which are compounds with $R^1$ being a substituted aliphatic hydrocarbon group or a substituted aromatic hydrocarbon group).

These silane compounds may be used alone or in combination.

To exhibit a high photocatalytic function and improve the dispersibility, the hydrocarbon group in the silane compound represented by formula (1) is preferably an aliphatic hydrocarbon group, more preferably a saturated aliphatic hydrocarbon group, particularly preferably an alkyl group. To exhibit a high photocatalytic function and improve the dispersibility, the hydrocarbon group in the silane compound is preferably a saturated aliphatic hydrocarbon group of 1 to 20 carbon atoms, more preferably a saturated aliphatic hydrocarbon group of 1 to 18 carbon atoms, still more preferably a saturated aliphatic hydrocarbon group of 4 to 12 carbon atoms, particularly preferably a saturated aliphatic hydrocarbon group of 4 to 10 carbon atoms.

Examples of the organometallic compound with the metal atom being aluminum include aluminum chelates, such as di-i-propoxy aluminum.ethyl acetoacetate; and aluminate coupling agents, such as acetoalkoxyaluminum diisopropylate.

Examples of the organometallic compound with the metal atom being titanium include titanate coupling agents, such as isopropyl triisostearoyl titanate, tetraoctyl bis(ditridecylphosphite) titanate, and bis(dioctylpyrophosphate)oxyacetate titanate; and titanium chelates, such as di-i-propoxy bis(ethylacetoacetate) titanium, di-i-propoxy bis(acetylacetonate) titanium, di-i-propoxy bis(triethanolaminate) titanium, di-i-propoxy titanium diacetate, and di-i-propoxy titanium dipropionate.

These organometallic compounds may be used alone or in combination.

When a treatment liquid prepared by mixing the organometallic compound with a solvent is used, the solvent used to prepare the treatment liquid may be any chemical substance that is compatible with the organometallic compound. The solvent used to prepare the treatment liquid is preferably an alcohol such as methanol, ethanol, propanol, or butanol or an organic solvent such as toluene, ethyl acetate, or acetone.

The amount of organometallic compound in the treatment liquid is preferably 10 parts by mass or more and 200 parts by mass or less, more preferably 20 parts by mass or more and 180 parts by mass or less, still more preferably 50 parts by mass or more and 150 parts by mass or less, relative to 100 parts by mass of the solvent.

The amount of organometallic compound for use in the surface treatment is preferably 10 parts by mass or more and 200 parts by mass or less, more preferably 20 parts by mass or more and 180 parts by mass or less, still more preferably 30 parts by mass or more and 150 parts by mass or less, relative to 100 parts by mass of the porous particles. Not less than 10 parts by mass of the organometallic compound allows a high photocatalytic function in the visible range to be more readily exhibited and also improves the dispersibility. Not more than 200 parts by mass of the organometallic compound inhibits an excess of carbon derived from the organometallic compound from being present on the surface of the porous particles, thus suppressing a decrease in photocatalytic function that might otherwise be caused by an excess of carbon.

After the surface treatment, a drying treatment is preferably performed in order to remove residues, such as an excess of the organometallic compound and the solvent of the treatment liquid. The drying treatment may be performed using a known method such as spray drying or tray drying, but the drying treatment is preferably performed by the step of removing the solvent from the dispersion including the porous particles by using supercritical carbon dioxide, more preferably by the step of removing the solvent by flowing supercritical carbon dioxide in supercritical carbon dioxide immediately after the surface treatment step (3). Specifically, these steps may be performed using the same procedure as described for step (2).

(4) Heat Treatment Step

The heat treatment step further improves the photocatalytic function of the silica-titania composite aerogel particle in the visible range. Although the mechanism is not fully understood, it is presumed that some of the hydrocarbon groups included in the surface layer are oxidized or carbonized by the heat treatment, whereby the silica-titania composite aerogel particle has absorption in the visible range, and a photocharge separation function is activated not only by UV light absorption but also by visible light absorption, as a result of which the photocatalytic function is exhibited. This indicates that the silica-titania composite aerogel particle has absorption at wavelengths of 450 nm and 750 nm in a visible absorption spectrum. In other words, some of the oxidized or carbonized hydrocarbon groups or carbonized carbon present on the surface of the silica-titania composite aerogel particle enables visible light absorption as well as UV light absorption, whereby a function to selectively trap electrons is activated. Presumably, this decreases the likelihood of recombination of electrons generated by light absorption and holes to efficiently promote separation of electric charges, and the promoted electric charge separation enhances the visible light responsivity of the silica-titania composite aerogel particle.

To improve the photocatalytic function, the temperature of the heat treatment is preferably 180° C. or higher and 500° C. or lower, more preferably 200° C. or higher and 450° C. or lower, still more preferably 250° C. or higher and 400° C. or lower. To improve the photocatalytic function, the time of the heat treatment is preferably 10 minutes or more and 24 hours or less, more preferably 20 minutes or more and 300 minutes or less, still more preferably 30 minutes or more and 120 minutes or less.

A heat-treatment temperature of 180° C. or higher and 500° C. or lower efficiently provides a silica-titania composite aerogel particle that exhibits a high photocatalytic function also in the visible range. Presumably, a heat treatment at 180° C. or higher and 500° C. or lower adequately oxidizes organic-metal-compound-derived hydrocarbon groups present on the surface of the silica-titania composite aerogel particle, converting some C—C bonds or C=C bonds into C—O bonds or C=O bonds.

The heat treatment is preferably performed in an atmosphere at an oxygen concentration (vol %) of 1% or more and 21% or less. A heat treatment in such an oxygen atmosphere may adequately and efficiently oxidize organic-metal-compound-derived hydrocarbon groups present on the surface of the silica-titania composite aerogel particle. The oxygen concentration (vol %) is more preferably 3% or more and 21% or less, still more preferably 5% or more and 21% or less.

The heat treatment may be performed by any known method such as heating in an electric furnace, a firing furnace (e.g., a roller-hearth kiln or a shuttle kiln), a radiant heating furnace, or a hot plate; or heating using laser beams, infrared rays, UV rays, or microwaves.

Through the above process, the silica-titania composite aerogel particle of the exemplary embodiment is obtained.

Photocatalyst-Forming Composition

A photocatalyst-forming composition of the exemplary embodiment contains the silica-titania composite aerogel particle of the exemplary embodiment and at least one compound selected from a dispersion medium and a binder.

Examples of the form of the photocatalyst-forming composition of the exemplary embodiment include a dispersion containing the silica-titania composite aerogel particle of the exemplary embodiment and a dispersion medium, and a composition containing the silica-titania composite aerogel particle of the exemplary embodiment and an organic or inorganic binder. The dispersion may be in the form of a highly viscous paste.

Examples of the dispersion medium suitable for use include water and organic solvents. Examples of water include water, distilled water, and pure water. Examples of organic solvents include, but are not limited to, hydrocarbon solvents, ester solvents, ether solvents, halogen solvents, and alcohol solvents. From the viewpoint of dispersion stability and storage stability, the dispersion preferably contains at least one compound selected from a dispersant and a surfactant. Known chemical substances are used as the dispersant and the surfactant. The dispersion may contain a binder in the form of an emulsion.

Examples of the binder for use in the composition include, but are not limited to, organic binders such as fluorocarbon resins, silicone resins, polyester resins, acrylic resins, styrene resins, acrylonitrile/styrene copolymer resins, acrylonitrile/butadiene/styrene copolymer (ABS) resins, epoxy resins, polycarbonate resins, polyamide resins, polyamine resins, polyurethane resins, polyether resins, polysulfide resins, polyphenol resins, composites thereof, silicone-modified products thereof, and halogen-modified products thereof; and inorganic binders such as glass, ceramic, and metal powder.

The photocatalyst-forming composition of the exemplary embodiment may further contain other components. The other components may be known additives, examples of which include promoters, colorants, fillers, preservatives, antifoaming agents, adhesion improvers, and thickeners.

The silica-titania composite aerogel particles of the exemplary embodiment contained in the photocatalyst-forming composition of the exemplary embodiment may be of one type or two or more types.

The content of the silica-titania composite aerogel particle of the exemplary embodiment in the photocatalyst-forming composition of the exemplary embodiment is not particularly limited and may be appropriately selected in accordance with, for example, the form, such as a dispersion or a resin composition, and the desired photocatalyst amount.

A photocatalyst including the photocatalyst-forming composition of the exemplary embodiment or a structure including the photocatalyst may be produced using any known application method. Examples of the method of applying the photocatalyst-forming composition of the exemplary embodiment include spin coating, dip coating, flow coating, spray coating, roll coating, brush coating, sponge coating, screen printing, and ink-jet printing.

Photocatalyst and Structure

A photocatalyst of the exemplary embodiment includes the silica-titania composite aerogel particle of the exemplary embodiment or is made of the silica-titania composite aerogel particle of the exemplary embodiment. A structure of the exemplary embodiment includes the silica-titania composite aerogel particle of the exemplary embodiment.

The photocatalyst of the exemplary embodiment may be a photocatalyst including the silica-titania composite aerogel particle of the exemplary embodiment alone, a photocatalyst obtained by mixing the silica-titania composite aerogel particle of the exemplary embodiment with a promoter, or a photocatalyst obtained by compacting the silica-titania composite aerogel particle of the exemplary embodiment into a desired shape with an adhesive or an agglutinant.

The structure of the exemplary embodiment preferably includes the silica-titania composite aerogel particle of the exemplary embodiment as a photocatalyst. From the viewpoint of photocatalytic activity, the structure of the exemplary embodiment preferably includes, at least on its surface, the silica-titania composite aerogel particle of the exemplary embodiment.

Preferably, the structure of the exemplary embodiment includes the silica-titania composite aerogel particle of the exemplary embodiment on at least a part of a surface of a substrate. More preferably, the structure is formed by applying the photocatalyst-forming composition of the exemplary embodiment to at least a part of a surface of a substrate. In the structure, the amount of application of the photocatalyst-forming composition of the exemplary embodiment is not particularly limited and may be selected as desired.

In the structure of the exemplary embodiment, the silica-titania composite aerogel particle of the exemplary embodiment may be attached or secured to a surface of a substrate. From the viewpoint of durability of the photocatalyst, the silica-titania composite aerogel particle is preferably secured. The silica-titania composite aerogel particle may be secured by any known method.

Examples of the substrate for use in the exemplary embodiment include various materials such as inorganic materials and organic materials, and the substrate may be of any shape. Examples of suitable substrates include metal, ceramic, glass, plastic, rubber, stone, cement, concrete, fiber, fabric, wood, paper, combinations thereof, laminates thereof, and articles obtained by coating surfaces of these substrates with at least one layer. Examples of suitable substrates viewed from the standpoint of applications include construction materials, exterior materials, window frames, window panes, mirrors, tables, tableware, curtains, lenses, prisms, exteriors and coatings of vehicles, exteriors of machines, exteriors of articles, dust covers and coatings, traffic signs, various displays, advertising columns, noise barriers for roadways, noise barriers for railways, bridges, exteriors and coatings of guardrails, interiors and coatings of tunnels, insulators, solar cell covers, solar collector covers of solar water heaters, polymer films, polymer sheets, filters, indoor signboards, outdoor signboards, vehicle light covers, outdoor lighting fixtures, air cleaners, water purifiers, medical apparatuses, and nursing care items.

EXAMPLES

The exemplary embodiment of the invention will now be described in detail with reference to examples, but these examples are not intended to limit the exemplary embodiment of the invention. In the following description, all "parts" are by mass unless otherwise specified.

Example 1

Dispersion Preparation Step 115.4 parts of methanol and 7.2 parts of tetramethoxysilane are placed and mixed. In addition, 7.2 parts of tetrabutoxy titanium is put into a reaction container and mixed. While stirring the mixed solution with a magnetic stirrer at 100 rpm, 7.5 parts of a 0.009% by mass aqueous oxalic acid solution is added dropwise thereto over 30 seconds. The resulting solution is held for 35 minutes while being stirred to obtain 137.2 parts of a first dispersion (I-1) (solid content, 4.5 parts; liquid-phase content, 132.7 parts).

Solvent Removal Step 137.2 parts of the first dispersion (I-1) is put into a reaction vessel, and $CO_2$ is fed thereinto with stirring at 85 rpm. The temperature is increased to 150° C., and the pressure is increased to 20 MPa. While continuing the stirring, $CO_2$ is flowed in and out over 60 minutes to remove 130 parts of the liquid phase.

Surface Treatment Step

To the solid phase that has remained after the removal of the liquid phase, a mixture of 4 parts of isobutyltrimethoxysilane and 4.5 parts of methanol is added over 5 minutes, and the resulting mixture is held at 150° C. and 20 MPa for 30 minutes with stirring at 85 rpm. While continuing the stirring, $CO_2$ is flowed in and out over 30 minutes to remove 8.5 parts of the liquid phase. The pressure is reduced to atmospheric pressure over 30 minutes, and 5.0 parts of powder is collected.

Heat Treatment Step

Into a stainless steel container, 0.5 part of the powder is weighed. The heat treatment is performed at 380° C. for 60 minutes in an electric furnace whose oxygen concentration (vol %) is set to 18%. The container is cooled to 30° C., and 0.5 part of the powder (silica-titania composite aerogel particles) is collected.

Comparative Examples 1 to 6 and Examples 2 to 23

Silica-titania composite aerogel particles are produced in the same manner as in Example 1 except that materials and treatment conditions are changed as shown in Tables 1 and 2.

Example 101

Dispersion Preparation Step 115.4 parts of methanol and 7.2 parts of tetramethoxysilane are put into a reaction container and mixed. In addition, 7.2 parts of tetrabutoxy titanium is placed and mixed. While stirring the mixed solution with a magnetic stirrer at 100 rpm, 7.5 parts of a 0.009% by mass aqueous oxalic acid solution is added dropwise thereto over 30 seconds. The resulting solution is held for 35 minutes while being stirred to obtain 137.2 parts of a first dispersion (I-1) (solid content, 4.5 parts; liquid-phase content, 132.7 parts).

137.2 parts of the first dispersion (I-1) is put into another reaction container, and a mixed solution of 0.45 part of tetrabutoxy titanium and 4.05 parts of butanol is added dropwise thereto over 10 minutes with stirring using a magnetic stirrer at 100 rpm. The resulting solution is held for 30 minutes while being stirred to obtain 141.7 parts of a second dispersion (II-1) (solid content, 3.5 parts; liquid-phase content, 138.2 parts).

Solvent Removal Step 141.7 parts of the second dispersion (II-1) is put into a reaction vessel, and $CO_2$ is fed thereinto with stirring at 85 rpm. The temperature is increased to 150° C., and the pressure is increased to 20 MPa. While continuing the stirring, $CO_2$ is flowed in and out over 60 minutes to remove 138 parts of the liquid phase.

Surface Treatment Step

To the solid phase that has remained after the removal of the liquid phase, a mixture of 4.1 parts of isobutyltrimethoxysilane and 4.5 parts of methanol is added over 5 minutes, and the resulting mixture is held at 150° C. and 20 MPa for 30 minutes with stirring at 85 rpm. While continuing the stirring, $CO_2$ is flowed in and out over 30 minutes to remove 8.5 parts of the liquid phase. The pressure is reduced to atmospheric pressure over 30 minutes, and 4.0 parts of powder is collected.

Heat Treatment Step

Into a stainless steel container, 0.5 part of the powder is weighed. The heat treatment is performed at 380° C. for 60 minutes in an electric furnace whose oxygen concentration (vol %) is set to 18%. The container is cooled to 30° C., and 0.5 part of the powder (silica-titania composite aerogel particles) is collected.

Comparative Examples 101 to 106 and Examples 102 to 123

Silica-titania composite aerogel particles are produced in the same manner as in Example 101 except that materials and treatment conditions are changed as shown in Tables 3 and 4.

Measurement of Physical Properties of Silica-Titania Composite Aerogel Particle

The physical properties of the silica-titania composite aerogel particles obtained in Examples and Comparative Examples are measured by methods described below. The results are shown in Tables 5 and 6. "UV-Vis properties" in Tables 5 and 6 are absorbances at wavelengths of 450 nm, 600 nm, and 750 nm relative to the absorbance at a wavelength of 350 nm taken as 1.

Element Ratio Si/Ti in Base Particle

Using an XPS analyzer, a qualitative analysis (wide scan analysis) is performed under the following conditions while etching the surface of the silica-titania composite aerogel particle in the depth direction, thereby identifying and quantifying titanium, silicon, and carbon. Using the data obtained, elemental profiles of titanium, silicon, and carbon are drawn with peak intensity plotted on the vertical axis and etching time on the horizontal axis. Each profile curve is divided into multiple regions at inflection points. A region (region A described above) where the peak intensity of titanium and the peak intensity of silicon are substantially constant is determined, and the element ratio Si/Ti in the region is determined.

XPS analyzer: VERSA PROBEII available from Ulvac-Phi, Incorporated
 X-ray source: monochromatized AlKa radiation
 Acceleration voltage: 15 kV
 X-ray beam diameter: 100 μm
 Etching gun: argon ion beam
 Etching output: 4 kV The elemental profiles of the silica-titania composite aerogel particles of Examples 1 to 23 reveal that these particles each have a surface layer on a base particle.

The elemental profiles of the silica-titania composite aerogel particles of Examples 101 to 123 reveal that these particles each have an intermediate layer and a surface layer on a base particle.

XPS Peak Intensity Ratio

For the purpose of removing $CO_2$ that has been left behind after the supercritical $CO_2$ treatment from pores of the silica-titania composite aerogel particle, degassing is performed at a temperature of 25° C. and a reduced pressure of 133 Pa for 3 hours by using a vacuum drying oven (model VOS-450VD available from Tokyo Rikakikai Co., LTD).

Next, a C is XPS spectrum is measured using an XPS analyzer under the following conditions, and (peak intensity of C—O bond+peak intensity of C=O bond)/(peak intensity of C—C bond+peak intensity of C=C bond) is determined.

XPS analyzer: VERSA PROBEII available from Ulvac-Phi, Incorporated
 X-ray source: monochromatized AlKa radiation
 Output: 25 W
 Acceleration voltage: 15 kV
 X-ray beam diameter: 100 μm
 Signal take-off angle: 45°
 Pass energy: 23.5 eV
 Charge neutralization gun 1.0 V/ion gun 10 V BET Specific Surface Area Using a MACSORB HM model-1201 manufactured by Mountech Co., Ltd. as a specific surface area meter, 50 mg of a sample is pretreated at 30° C. for 120 minutes for degassing, and a BET specific surface area is determined by a BET multipoint method using a nitrogen gas with a purity of 99.99% or more.

Average Size of Primary Particles Constituting Base Particle (Average Primary Particle Size)

Using a sample mill (model SK-M2 available from Kyoritsu-riko Co., Ltd.), 100 parts of resin particles having a volume average particle size of 8 μm (styrene-butyl acrylate copolymer particles: copolymerization ratio (by mass), 80:20; weight average molecular weight, 130,000; glass transition temperature, 59° C.) and 1.0 part of the silica-titania composite aerogel particles are mixed at 13,000 rpm for 2 minutes.

The silica-titania composite aerogel particles dispersed in the resin particles are observed under a scanning electron microscope (S-4100 available from Hitachi, Ltd.), and an image is photographed. When the image is photographed, the scanning electron microscope is adjusted to a magnification that enables image analysis of primary particles, which are particles forming an aggregate particle as shown schematically in FIG. 1. The image is imported into an image analyzer (LUZEX III available from Nireco), and areas of the primary particles are determined by image analysis of the particles. Equivalent circle diameters (nm) are calculated from the areas, and the equivalent circle diameters are averaged to determine the average primary particle size (nm) (denoted by "Dp" in Tables 5 and 6). The average primary particle size is determined by analyzing about 10 to 50 primary particles.

Volume Average Particle Size and Volume Particle Size Distribution of Silica-Titania Composite Aerogel Particles Using a sample mill (model SK-M2 available from Kyoritsu-riko Co., Ltd.), 100 parts of resin particles having a volume average particle size of 8 μm (styrene-butyl acrylate copolymer particles: copolymerization ratio (by mass), 80:20; weight average molecular weight, 130,000; glass transition temperature, 59° C.) and 1.0 part of the silica-titania composite aerogel particles are mixed at 13,000 rpm for 2 minutes.

The particle mixture in an amount of 0.1 g is put into a beaker, and 1.5 g of an aqueous surfactant solution obtained by diluting an anionic surfactant (TAYCAPOWER BN2060 available from Tayca Corporation) with ion-exchanged water to a concentration of 12% is added thereto to sufficiently wet the particle mixture. Next, 5 g of pure water is added thereto, and the resultant is dispersed for 30 minutes using an ultrasonic disperser, after which the resin particles are removed by using No. 5C filter paper to obtain a silica-titania composite aerogel particle dispersion. The particle size of the particles in the silica-titania composite aerogel particle dispersion is measured using a dynamic light scattering particle size analyzer (NANOTRAC UPA-ST available from MicrotracBEL Corp.) to obtain a volume-based particle size distribution. D50v, which is a particle size at which the cumulative volume is 50% from smaller particle sizes, is determined, and D50 v is defined as a volume average particle size (μm) (denoted by "Da" in Tables 5 and 6). D10 v, which is a particle size at which the cumulative volume is 10% from smaller particle sizes, and D90 v, which is a particle size at which the cumulative volume is 90% from smaller particle sizes, are determined, and a volume particle size distribution expressed as GSDv= $(D90 v/D10 v)^{1/2}$ is calculated.

Ultraviolet-Visible Absorption Spectrum

The silica-titania composite aerogel particles are dispersed in tetrahydrofuran. The dispersion is then applied to a glass substrate and dried in air at 24° C. Using a U-4100 spectrophotometer (Hitachi High-Technologies Corporation), a diffuse reflectance spectrum in the wavelength range of 200 nm to 900 nm is measured in a diffuse reflectance configuration under the following conditions: scanning speed, 600 nm; slit width, 2 nm; sampling interval, 1 nm. From the diffuse reflectance spectrum, the absorbance at each wavelength is theoretically determined by Kubelka-Munk conversion to obtain an ultraviolet-visible absorption spectrum.

The silica-titania composite aerogel particles of Examples 1 to 23 and Examples 101 to 123 have absorption over the entire wavelength range of 400 nm to 800 nm.

Property Evaluation of Silica-Titania Composite Aerogel Particle

Gas Adsorptivity and Gas Decomposability

To determine the activities of the silica-titania composite aerogel particles obtained in Examples and Comparative Examples, their gas adsorptivity and gas decomposability in response to visible light irradiation are evaluated as described below. The results are shown in Tables 5 and 6.

The silica-titania composite aerogel particles obtained in Examples and Comparative Examples are each dispersed in methanol at a solids concentration of 4% by mass. The dispersion in an amount of 0.25 g is applied to a half (10 cm$^2$ area) of a microscope glass plate and then thoroughly dried to prepare a test piece including the glass plate to the surface (half) of which the particles are uniformly attached. For each of the silica-titania composite aerogel particles of Examples and Comparative Examples, two test pieces are prepared.

Immediately after being prepared, the test pieces are placed in 1 L TEDLAR bags each having one cock (one test piece is placed in one TEDLAR bag). The TEDLAR bags are deflated, sealed, and then stored in the dark with the coated surface facing upward until property evaluation testing.

The property evaluation testing is performed according to the following procedure.

First, all the air remaining in the test-piece-containing TEDLAR bags is removed through the cocks by using an aspirator, and 800 ml of ammonia gas at a concentration of 100 ppm is then injected into the bags. Next, one of the two same test-piece-containing TEDLAR bags is continuously irradiated with visible light (5,500 LX (lux) at the test piece surface) by using a light-emitting diode (LED) that emits visible light at a wavelength of 400 nm or more and 800 nm or less. The other of the two same test-piece-containing TEDLAR bags is stored in a lightproof black box for 1 hour.

The ammonia gas concentration in the test-piece-containing TEDLAR bag that has been continuously irradiated with visible light for 1 hour and the test-piece-containing TEDLAR bag that has been stored in the black box for 1 hour is measured using a detector tube (Gastec Corporation). An ammonia gas adsorptivity index ΔA and an ammonia-gas-decomposing rate ΔS in response to visible light irradiation are determined from the following formulas.

S1=ammonia gas concentration (ppm) in TEDLAR bag that has been continuously irradiated with visible light for 1 hour S2=ammonia gas concentration (ppm) in TEDLAR bag that has been stored in black box for 1 hour Ammonia gas adsorptivity index ΔA (ppm)=100−S2

Ammonia-gas-decomposing rate ΔS (%)=(S2−S1)/S2×100

The gas adsorptivity and the gas decomposability are evaluated from the above values as follows.

Gas Adsorptivity

G1: 90≤ΔA, adsorptivity is very good.

G2: 70ΔA<90, adsorptivity is good.

G3: 50≤ΔA<70, adsorptivity is slightly good.

G4: ΔA<50, adsorptivity is poor.

Gas Decomposability

G1: 30≤ΔS, decomposability is very good.

G2: 15≤ΔS<30, decomposability is good.

G3: 5≤ΔS<15, decomposability is slightly good.

G4: ΔS<5, decomposability is poor.

Amount of Coarse Particles

A sieve with 20 μm openings is provided and accurately weighed to the nearest 0.01 g. The silica-titania composite aerogel particles in an amount of 1.00 g are passed through the sieve by suction with a dust collector. In this process, aggregates on the sieve are disintegrated using a brush so as to pass through the sieve, and strong aggregates that are not disintegrated are left on the sieve. From the weights (g) of the sieve before and after the silica-titania composite aerogel particles are passed, a coarse particle index is calculated by the following formula. The results are shown in Tables 5 and 6.

Coarse particle index (%)=(weight of sieve after passing−weight of sieve before passing)/1.00×100

A: coarse particle index is 1% or less.

B: coarse particle index is more than 1% and 5% or less.

C: coarse particle index is more than 5%.

TABLE 1

| | Dispersion preparation First dispersion | | | | | | |
|---|---|---|---|---|---|---|---|
| | Alcohol | | Alkoxysilane | | Titanium alkoxide | | Retention |
| | Type | Amount (parts) | Type | Amount (parts) | Type | Amount (parts) | time (min) |
| Example 1 | methanol | 115.4 | tetramethoxysilane | 7.2 | tetrabutoxytitanium | 7.2 | 35 |
| Comparative example 1 | methanol | 115.4 | tetramethoxysilane | 10.9 | tetrabutoxytitanium | 3.4 | 35 |
| Comparative example 2 | methanol | 115.4 | tetramethoxysilane | 7.2 | tetrabutoxytitanium | 7.2 | 35 |
| Comparative example 3 | methanol | 115.4 | tetramethoxysilane | 7.2 | tetrabutoxytitanium | 7.2 | 35 |
| Comparative example 4 | methanol | 450 | tetramethoxysilane | 7.2 | tetrabutoxytitanium | 7.2 | 35 |
| Comparative example 5 | methanol | 5 | tetramethoxysilane | 7.2 | tetrabutoxytitanium | 7.2 | 35 |
| Comparative example 6 | methanol | 115.4 | tetramethoxysilane | 7.2 | tetrabutoxytitanium | 7.2 | 35 |
| Example 2 | methanol | 115.4 | tetramethoxysilane | 10.3 | tetrabutoxytitanium | 4 | 35 |
| Example 3 | methanol | 115.4 | tetramethoxysilane | 0.3 | tetrabutoxytitanium | 14 | 35 |
| Example 4 | methanol | 346.2 | tetramethoxysilane | 7.2 | tetrabutoxytitanium | 7.2 | 35 |
| Example 5 | methanol | 23.1 | tetramethoxysilane | 7.2 | tetrabutoxytitanium | 7.2 | 35 |
| Example 6 | butanol | 115.4 | tetramethoxysilane | 7.2 | tetrabutoxytitanium | 7.2 | 35 |
| Example 7 | methanol | 115.4 | tetraethoxysilane | 7.2 | tetrabutoxytitanium | 7.2 | 35 |
| Example 8 | methanol | 115.4 | tetramethoxysilane | 7.2 | tetrapropoxytitanium | 7.2 | 35 |

| | Dispersion preparation Second dispersion | | | | | |
|---|---|---|---|---|---|---|
| | First dispersion (parts) | Titanium alkoxide | | Alcohol | | Retention time (min) |
| | | Type | Amount (parts) | Type | Amount (parts) | |
| Example 1 | | | no intermediate layer | | | |
| Comparative example 1 | | | no intermediate layer | | | |
| Comparative example 2 | | | no intermediate layer | | | |
| Comparative example 3 | | | no intermediate layer | | | |
| Comparative example 4 | | | no intermediate layer | | | |
| Comparative example 5 | | | no intermediate layer | | | |
| Comparative example 6 | | | no intermediate layer | | | |
| Example 2 | | | no intermediate layer | | | |
| Example 3 | | | no intermediate layer | | | |
| Example 4 | | | no intermediate layer | | | |
| Example 5 | | | no intermediate layer | | | |
| Example 6 | | | no intermediate layer | | | |
| Example 7 | | | no intermediate layer | | | |
| Example 8 | | | no intermediate layer | | | |

| | Surface treatment | | | | Heat treatment | | |
|---|---|---|---|---|---|---|---|
| | Solvent removal Treatment atmosphere | Treatment atmosphere | Organometallic compound | | Temperature (° C.) | Time (min) | Oxygen concentration (vol %) |
| | | | Type | Amount (parts) | | | |
| Example 1 | supercritical $CO_2$ | supercritical $CO_2$ | isobutyltrimethoxysilane | 4 | 380 | 60 | 18 |
| Comparative example 1 | supercritical $CO_2$ | supercritical $CO_2$ | isobutyltrimethoxysilane | 4 | 380 | 60 | 28 |
| Comparative example 2 | supercritical $CO_2$ | supercritical $CO_2$ | isobutyltrimethoxysilane | 1 | 110 | 60 | 20 |
| Comparative example 3 | supercritical $CO_2$ | supercritical $CO_2$ | isobutyltrimethoxysilane | 6.5 | 580 | 80 | 21 |
| Comparative example 4 | supercritical $CO_2$ | supercritical $CO_2$ | isobutyltrimethoxysilane | 4.5 | 380 | 60 | 20 |
| Comparative example 5 | supercritical $CO_2$ | supercritical $CO_2$ | isobutyltrimethoxysilane | 4.5 | 380 | 60 | 20 |
| Comparative example 6 | supercritical $CO_2$ | supercritical $CO_2$ | isobutyltrimethoxysilane | 3 | — | — | — |

TABLE 1-continued

| | | | | | | | |
|---|---|---|---|---|---|---|---|
| Example 2 | supercritical CO₂ | supercritical CO₂ | isobutyltrimethoxysilane | 4 | 380 | 60 | 20 |
| Example 3 | supercritical CO₂ | supercritical CO₂ | isobutyltrimethoxysilane | 4 | 380 | 60 | 19 |
| Example 4 | supercritical CO₂ | supercritical CO₂ | isobutyltrimethoxysilane | 4 | 380 | 60 | 20 |
| Example 5 | supercritical CO₂ | supercritical CO₂ | isobutyltrimethoxysilane | 4 | 380 | 60 | 20 |
| Example 6 | supercritical CO₂ | supercritical CO₂ | isobutyltrimethoxysilane | 4 | 380 | 60 | 20 |
| Example 7 | supercritical CO₂ | supercritical CO₂ | isobutyltrimethoxysilane | 4 | 380 | 60 | 20 |
| Example 8 | supercritical CO₂ | supercritical CO₂ | isobutyltrimethoxysilane | 4 | 380 | 60 | 20 |

TABLE 2

| | Dispersion preparation First dispersion | | | | | | |
|---|---|---|---|---|---|---|---|
| | Alcohol | | Alkoxysilane | | Titanium alkoxide | | Retention |
| | Type | Amount (parts) | Type | Amount (parts) | Type | Amount (parts) | time (min) |
| Example 9 | methanol | 115.4 | tetramethoxysilane | 7.2 | tetrabutoxytitanium | 7.2 | 35 |
| Example 10 | methanol | 115.4 | tetramethoxysilane | 7.2 | tetrabutoxytitanium | 7.2 | 35 |
| Example 11 | methanol | 115.4 | tetramethoxysilane | 7.2 | tetrabutoxytitanium | 7.2 | 35 |
| Example 12 | methanol | 115.4 | tetramethoxysilane | 7.2 | tetrabutoxytitanium | 7.2 | 35 |
| Example 13 | methanol | 115.4 | tetramethoxysilane | 7.2 | tetrabutoxytitanium | 7.2 | 35 |
| Example 14 | methanol | 115.4 | tetramethoxysilane | 7.2 | tetrabutoxytitanium | 7.2 | 35 |
| Example 15 | methanol | 115.4 | tetramethoxysilane | 7.2 | tetrabutoxytitanium | 7.2 | 35 |
| Example 16 | methanol | 115.4 | tetramethoxysilane | 7.2 | tetrabutoxytitanium | 7.2 | 35 |
| Example 17 | methanol | 115.4 | tetramethoxysilane | 7.2 | tetrabutoxytitanium | 7.2 | 35 |
| Example 18 | methanol | 115.4 | tetramethoxysilane | 7.2 | tetrabutoxytitanium | 7.2 | 35 |
| Example 19 | methanol | 115.4 | tetramethoxysilane | 7.2 | tetrabutoxytitanium | 7.2 | 35 |
| Example 20 | methanol | 115.4 | tetramethoxysilane | 7.2 | tetrabutoxytitanium | 7.2 | 35 |
| Example 21 | methanol | 115.4 | tetramethoxysilane | 7.2 | tetrabutoxytitanium | 7.2 | 35 |
| Example 22 | methanol | 115.4 | tetramethoxysilane | 7.2 | tetrabutoxytitanium | 7.2 | 35 |
| Example 23 | methanol | 115.4 | tetramethoxysilane | 7.2 | tetrabutoxytitanium | 7.2 | 35 |

| | Dispersion preparation Second dispersion | | | | | |
|---|---|---|---|---|---|---|
| | First dispersion (parts) | Titanium alkoxide Type | Amount (parts) | Alcohol Type | Amount (parts) | Retention time (min) |
| Example 9 | | no intermediate layer | | | | |
| Example 10 | | no intermediate layer | | | | |
| Example 11 | | no intermediate layer | | | | |
| Example 12 | | no intermediate layer | | | | |
| Example 13 | | no intermediate layer | | | | |
| Example 14 | | no intermediate layer | | | | |
| Example 15 | | no intermediate layer | | | | |
| Example 16 | | no intermediate layer | | | | |
| Example 17 | | no intermediate layer | | | | |
| Example 18 | | no intermediate layer | | | | |
| Example 19 | | no intermediate layer | | | | |
| Example 20 | | no intermediate layer | | | | |
| Example 21 | | no intermediate layer | | | | |
| Example 22 | | no intermediate layer | | | | |
| Example 23 | | no intermediate layer | | | | |

| | Solvent removal | Surface treatment | | | Heat treatment | | |
|---|---|---|---|---|---|---|---|
| | Treatment atmosphere | Treatment atmosphere | Organometallic compound Type | Amount (parts) | Temperature (°C.) | Time (min) | Oxygen concentration (vol %) |
| Example 9 | supercritical CO₂ | supercritical CO₂ | hexyltrimethoxysilane | 4.5 | 380 | 60 | 21 |
| Example 10 | supercritical CO₂ | supercritical CO₂ | decyltrimethoxysilane | 5.2 | 380 | 60 | 21 |
| Example 11 | supercritical CO₂ | supercritical CO₂ | methyltrimethoxysilane | 3.1 | 380 | 60 | 21 |
| Example 12 | supercritical CO₂ | supercritical CO₂ | dodecyltrimethoxysilane | 5.5 | 380 | 60 | 21 |
| Example 13 | supercritical CO₂ | supercritical CO₂ | octadecyltrimethoxysilane | 4.8 | 380 | 60 | 21 |
| Example 14 | supercritical CO₂ | supercritical CO₂ | octyltrichlorosilane | 3.6 | 380 | 60 | 21 |
| Example 15 | supercritical CO₂ | supercritical CO₂ | dimethoxy(methyl)(octyl)silane | 3.4 | 380 | 60 | 21 |
| Example 16 | supercritical CO₂ | supercritical CO₂ | tri-n-hexylchlorosilane | 3.4 | 380 | 60 | 21 |
| Example 17 | supercritical CO₂ | supercritical CO₂ | n-octyldimethylchlorosilane | 4.2 | 380 | 60 | 21 |
| Example 18 | supercritical CO₂ | supercritical CO₂ | hexamethyldisilazane | 4.5 | 380 | 60 | 21 |
| Example 19 | supercritical CO₂ | supercritical CO₂ | isopropyl triisostearoyl titanate | 3.4 | 380 | 60 | 21 |

TABLE 2-continued

| | | | | | | | |
|---|---|---|---|---|---|---|---|
| Example 20 | supercritical $CO_2$ | supercritical $CO_2$ | acetoalkoxyaluminum diisopropylate | 3.5 | 380 | 60 | 21 |
| Example 21 | supercritical $CO_2$ | nitrogen (dry) | isobutyltrimethoxysilane | 3.6 | 380 | 60 | 21 |
| Example 22 | supercritical $CO_2$ | supercritical $CO_2$ | isobutyltrimethoxysilane | 3.4 | 180 | 60 | 21 |
| Example 23 | supercritical $CO_2$ | supercritical $CO_2$ | isobutyltrimethoxysilane | 3.4 | 500 | 60 | 21 |

TABLE 3

| | Dispersion preparation First dispersion | | | | | | |
|---|---|---|---|---|---|---|---|
| | Alcohol | | Alkoxysilane | | Titanium alkoxide | | Retention |
| | Type | Amount (parts) | Type | Amount (parts) | Type | Amount (parts) | time (min) |
| Example 101 | methanol | 115.4 | tetramethoxysilane | 7.2 | tetrabutoxytitanium | 7.2 | 35 |
| Comparative example 101 | methanol | 115.4 | tetramethoxysilane | 10.9 | tetrabutoxytitanium | 3.4 | 35 |
| Comparative example 102 | methanol | 115.4 | tetramethoxysilane | 7.2 | tetrabutoxytitanium | 7.2 | 35 |
| Comparative example 103 | methanol | 115.4 | tetramethoxysilane | 7.2 | tetrabutoxytitanium | 7.2 | 35 |
| Comparative example 104 | methanol | 450 | tetramethoxysilane | 7.2 | tetrabutoxytitanium | 7.2 | 35 |
| Comparative example 105 | methanol | 5 | tetramethoxysilane | 7.2 | tetrabutoxytitanium | 7.2 | 35 |
| Comparative example 106 | methanol | 115.4 | tetramethoxysilane | 7.2 | tetrabutoxytitanium | 7.2 | 35 |
| Example 102 | methanol | 115.4 | tetramethoxysilane | 10.3 | tetrabutoxytitanium | 4 | 35 |
| Example 103 | methanol | 115.4 | tetramethoxysilane | 0.3 | tetrabutoxytitanium | 14 | 35 |
| Example 104 | methanol | 346.2 | tetramethoxysilane | 7.2 | tetrabutoxytitanium | 7.2 | 35 |
| Example 105 | methanol | 23.1 | tetramethoxysilane | 7.2 | tetrabutoxytitanium | 7.2 | 35 |
| Example 106 | butanol | 115.4 | tetramethoxysilane | 7.2 | tetrabutoxytitanium | 7.2 | 35 |
| Example 107 | methanol | 115.4 | tetraethoxysilane | 7.2 | tetrabutoxytitanium | 7.2 | 35 |
| Example 108 | methanol | 115.4 | tetramethoxysilane | 7.2 | tetrapropoxytitanium | 7.2 | 35 |

| | Dispersion preparation Second dispersion | | | | | |
|---|---|---|---|---|---|---|
| | First dispersion (parts) | Titanium alkoxide | | Alcohol | | Retention time (min) |
| | | Type | Amount (parts) | Type | Amount (parts) | |
| Example 101 | 137.2 | tetrabutoxytitanium | 0.45 | butanol | 4.05 | 30 |
| Comparative example 101 | 137.2 | tetrabutoxytitanium | 0.45 | butanol | 4.05 | 30 |
| Comparative example 102 | 137.2 | tetrabutoxytitanium | 0.45 | butanol | 4.05 | 30 |
| Comparative example 103 | 137.2 | tetrabutoxytitanium | 0.45 | butanol | 4.05 | 30 |
| Comparative example 104 | 137.2 | tetrabutoxytitanium | 0.45 | butanol | 4.05 | 30 |
| Comparative example 105 | 137.2 | tetrabutoxytitanium | 0.45 | butanol | 4.05 | 30 |
| Comparative example 106 | 137.2 | tetrabutoxytitanium | 0.45 | butanol | 4.05 | 30 |
| Example 102 | 137.2 | tetrabutoxytitanium | 0.45 | butanol | 4.05 | 30 |
| Example 103 | 137.2 | tetrabutoxytitanium | 0.45 | butanol | 4.05 | 30 |
| Example 104 | 137.2 | tetrabutoxytitanium | 0.45 | butanol | 4.05 | 30 |
| Example 105 | 137.2 | tetrabutoxytitanium | 0.45 | butanol | 4.05 | 30 |
| Example 106 | 137.2 | tetrabutoxytitanium | 0.45 | butanol | 4.05 | 30 |
| Example 107 | 137.2 | tetrabutoxytitanium | 0.45 | butanol | 4.05 | 30 |
| Example 108 | 137.2 | tetrabutoxytitanium | 0.45 | butanol | 4.05 | 30 |

| | | Surface treatment | | Heat treatment | | |
|---|---|---|---|---|---|---|
| | Solvent removal Treatment atmosphere | Treatment atmosphere | Organometallic compound | | Temperature (° C.) | Time (min) | Oxygen concentration (vol %) |
| | | | Type | Amount (parts) | | | |
| Example 101 | supercritical $CO_2$ | supercritical $CO_2$ | isobutyltrimethoxysilane | 4.1 | 380 | 60 | 18 |
| Comparative example 101 | supercritical $CO_2$ | supercritical $CO_2$ | isobutyltrimethoxysilane | 4.1 | 380 | 60 | 28 |
| Comparative example 102 | supercritical $CO_2$ | supercritical $CO_2$ | isobutyltrimethoxysilane | 1 | 110 | 60 | 20 |

TABLE 3-continued

| | | | | | | | |
|---|---|---|---|---|---|---|---|
| Comparative example 103 | supercritical CO$_2$ | supercritical CO$_2$ | isobutyltrimethoxysilane | 6 | 580 | 60 | 20 |
| Comparative example 104 | supercritical CO$_2$ | supercritical CO$_2$ | isobutyltrimethoxysilane | 4.5 | 380 | 60 | 20 |
| Comparative example 105 | supercritical CO$_2$ | supercritical CO$_2$ | isobutyltrimethoxysilane | 4.1 | 380 | 60 | 21 |
| Comparative example 106 | supercritical CO$_2$ | supercritical CO$_2$ | isobutyltrimethoxysilane | 3.4 | — | — | — |
| Example 102 | supercritical CO$_2$ | supercritical CO$_2$ | isobutyltrimethoxysilane | 4.1 | 380 | 60 | 20 |
| Example 103 | supercritical CO$_2$ | supercritical CO$_2$ | isobutyltrimethoxysilane | 4.1 | 380 | 60 | 19 |
| Example 104 | supercritical CO$_2$ | supercritical CO$_2$ | isobutyltrimethoxysilane | 4.1 | 380 | 60 | 20 |
| Example 105 | supercritical CO$_2$ | supercritical CO$_2$ | isobutyltrimethoxysilane | 4.1 | 380 | 60 | 20 |
| Example 106 | supercritical CO$_2$ | supercritical CO$_2$ | isobutyltrimethoxysilane | 4.1 | 380 | 60 | 20 |
| Example 107 | supercritical CO$_2$ | supercritical CO$_2$ | isobutyltrimethoxysilane | 4.1 | 380 | 60 | 20 |
| Example 108 | supercritical CO$_2$ | supercritical CO$_2$ | isobutyltrimethoxysilane | 4.1 | 380 | 60 | 20 |

TABLE 4

| | Dispersion preparation First dispersion | | | | | | |
|---|---|---|---|---|---|---|---|
| | Alcohol | | Alkoxysilane | | Titanium alkoxide | | Retention |
| | Type | Amount (parts) | Type | Amount (parts) | Type | Amount (parts) | time (min) |
| Example 109 | methanol | 115.4 | tetramethoxysilane | 7.2 | tetrabutoxytitanium | 7.2 | 35 |
| Example 110 | methanol | 115.4 | tetramethoxysilane | 7.2 | tetrabutoxytitanium | 7.2 | 35 |
| Example 111 | methanol | 115.4 | tetramethoxysilane | 7.2 | tetrabutoxytitanium | 7.2 | 35 |
| Example 112 | methanol | 115.4 | tetramethoxysilane | 7.2 | tetrabutoxytitanium | 7.2 | 35 |
| Example 113 | methanol | 115.4 | tetramethoxysilane | 7.2 | tetrabutoxytitanium | 7.2 | 35 |
| Example 114 | methanol | 115.4 | tetramethoxysilane | 7.2 | tetrabutoxytitanium | 7.2 | 35 |
| Example 115 | methanol | 115.4 | tetramethoxysilane | 7.2 | tetrabutoxytitanium | 7.2 | 35 |
| Example 116 | methanol | 115.4 | tetramethoxysilane | 7.2 | tetrabutoxytitanium | 7.2 | 35 |
| Example 117 | methanol | 115.4 | tetramethoxysilane | 7.2 | tetrabutoxytitanium | 7.2 | 35 |
| Example 118 | methanol | 115.4 | tetramethoxysilane | 7.2 | tetrabutoxytitanium | 7.2 | 35 |
| Example 119 | methanol | 115.4 | tetramethoxysilane | 7.2 | tetrabutoxytitanium | 7.2 | 35 |
| Example 120 | methanol | 115.4 | tetramethoxysilane | 7.2 | tetrabutoxytitanium | 7.2 | 35 |
| Example 121 | methanol | 115.4 | tetramethoxysilane | 7.2 | tetrabutoxytitanium | 7.2 | 35 |
| Example 122 | methanol | 115.4 | tetramethoxysilane | 7.2 | tetrabutoxytitanium | 7.2 | 35 |
| Example 123 | methanol | 115.4 | tetramethoxysilane | 7.2 | tetrabutoxytitanium | 7.2 | 35 |

| | Dispersion preparation Second dispersion | | | | | |
|---|---|---|---|---|---|---|
| | First dispersion (parts) | Titanium alkoxide | | Alcohol | | Retention time (min) |
| | | Type | Amount (parts) | Type | Amount (parts) | |
| Example 109 | 137.2 | tetrabutoxytitanium | 0.45 | butanol | 4.05 | 30 |
| Example 110 | 137.2 | tetrabutoxytitanium | 0.45 | butanol | 4.05 | 30 |
| Example 111 | 137.2 | tetrabutoxytitanium | 0.45 | butanol | 4.05 | 30 |
| Example 112 | 137.2 | tetrabutoxytitanium | 0.45 | butanol | 4.05 | 30 |
| Example 113 | 137.2 | tetrabutoxytitanium | 0.45 | butanol | 4.05 | 30 |
| Example 114 | 137.2 | tetrabutoxytitanium | 0.45 | butanol | 4.05 | 30 |
| Example 115 | 137.2 | tetrabutoxytitanium | 0.45 | butanol | 4.05 | 30 |
| Example 116 | 137.2 | tetrabutoxytitanium | 0.45 | butanol | 4.05 | 30 |
| Example 117 | 137.2 | tetrabutoxytitanium | 0.45 | butanol | 4.05 | 30 |
| Example 118 | 137.2 | tetrabutoxytitanium | 0.45 | butanol | 4.05 | 30 |
| Example 119 | 137.2 | tetrabutoxytitanium | 0.45 | butanol | 4.05 | 30 |
| Example 120 | 137.2 | tetrabutoxytitanium | 0.45 | butanol | 4.05 | 30 |
| Example 121 | 137.2 | tetrabutoxytitanium | 0.45 | butanol | 4.05 | 30 |
| Example 122 | 137.2 | tetrabutoxytitanium | 0.45 | butanol | 4.05 | 30 |
| Example 123 | 137.2 | tetrabutoxytitanium | 0.45 | butanol | 4.05 | 30 |

| | Solvent removal | Surface treatment | | | Heat treatment | | |
|---|---|---|---|---|---|---|---|
| | Treatment atmosphere | Treatment atmosphere | Organometallic compound | | Temperature (° C.) | Time (min) | Oxygen concentration (vol %) |
| | | | Type | Amount (parts) | | | |
| Example 109 | supercritical CO$_2$ | supercritical CO$_2$ | hexyltrimethoxysilane | 4.3 | 380 | 60 | 21 |
| Example 110 | supercritical CO$_2$ | supercritical CO$_2$ | decyltrimethoxysilane | 5.1 | 380 | 60 | 21 |
| Example 111 | supercritical CO$_2$ | supercritical CO$_2$ | methyltrimethoxysilane | 3 | 380 | 60 | 21 |
| Example 112 | supercritical CO$_2$ | supercritical CO$_2$ | dodecyltrimethoxysilane | 5.4 | 380 | 60 | 21 |

TABLE 4-continued

| | | | | | | | |
|---|---|---|---|---|---|---|---|
| Example 113 | supercritical $CO_2$ | supercritical $CO_2$ | octadecyltrimethoxysilane | 4.5 | 380 | 60 | 21 |
| Example 114 | supercritical $CO_2$ | supercritical $CO_2$ | octyltrichlorosilane | 3.5 | 380 | 60 | 21 |
| Example 115 | supercritical $CO_2$ | supercritical $CO_2$ | dimethoxy(methyl)(octyl)silane | 3.3 | 380 | 60 | 21 |
| Example 116 | supercritical $CO_2$ | supercritical $CO_2$ | tri-n-hexylchlorosilane | 3.3 | 380 | 60 | 21 |
| Example 117 | supercritical $CO_2$ | supercritical $CO_2$ | n-octyldimethylchlorosilane | 4.1 | 380 | 60 | 21 |
| Example 118 | supercritical $CO_2$ | supercritical $CO_2$ | hexamethyldisilazane | 4.4 | 380 | 60 | 21 |
| Example 119 | supercritical $CO_2$ | supercritical $CO_2$ | isopropyl triisostearoyl titanate | 3.4 | 380 | 60 | 21 |
| Example 120 | supercritical $CO_2$ | supercritical $CO_2$ | acetoalkoxyaluminum diisopropylate | 3.6 | 380 | 60 | 21 |
| Example 121 | supercritical $CO_2$ | nitrogen (dry) | isobutyltrimethoxysilane | 3.5 | 380 | 60 | 21 |
| Example 122 | supercritical $CO_2$ | supercritical $CO_2$ | isobutyltrimethoxysilane | 3.4 | 180 | 60 | 21 |
| Example 123 | supercritical $CO_2$ | supercritical $CO_2$ | isobutyltrimethoxysilane | 3.4 | 500 | 60 | 21 |

TABLE 5

| | Properties of silica-titania composite aerogel particles | | | | | | UV-Vis properties |
|---|---|---|---|---|---|---|---|
| | Element ratio Si/Ti of base particle | XPS peak intensity ratio | BET specific surface area ($m^2/g$) | Dp (nm) | Da (μm) | GSDv | 450 nm absorbance |
| Example 1 | 3.2 | 0.15 | 710 | 55 | 0.52 | 2.7 | 0.50 |
| Comparative Example 1 | 7.1 | 0.16 | 750 | 45 | 0.55 | 3.2 | 0.59 |
| Comparative Example 2 | 2.9 | 0.01 | 710 | 55 | 0.52 | 2.7 | 0.02 |
| Comparative Example 3 | 2.8 | 0.42 | 710 | 55 | 0.55 | 2.7 | 0.02 |
| Comparative Example 4 | 2.7 | 0.16 | 190 | 115 | 0.21 | 1.3 | 0.60 |
| Comparative Example 5 | 2.7 | 0.14 | 1250 | 19 | 4.60 | 12 | 0.61 |
| Comparative Example 6 | 3.1 | 0.15 | 710 | 45 | 0.52 | 2.7 | 0 |
| Example 2 | 5.8 | 0.15 | 690 | 45 | 0.52 | 2.6 | 0.62 |
| Example 3 | 0.04 | 0.16 | 410 | 75 | 0.55 | 2.6 | 0.69 |
| Example 4 | 3.2 | 0.14 | 210 | 85 | 0.15 | 1.6 | 0.61 |
| Example 5 | 3.3 | 0.16 | 1100 | 23 | 2.70 | 9.5 | 0.62 |
| Example 6 | 3.1 | 0.14 | 590 | 45 | 0.45 | 2.7 | 0.63 |
| Example 7 | 2.5 | 0.15 | 610 | 55 | 0.51 | 2.7 | 0.61 |
| Example 8 | 2.7 | 0.16 | 540 | 65 | 0.52 | 2.7 | 0.61 |
| Example 9 | 3.1 | 0.16 | 610 | 55 | 0.51 | 2.7 | 0.61 |
| Example 10 | 2.9 | 0.14 | 605 | 55 | 0.52 | 2.6 | 0.62 |
| Example 11 | 3.3 | 0.14 | 595 | 55 | 0.52 | 2.6 | 0.62 |
| Example 12 | 3.1 | 0.15 | 585 | 55 | 0.51 | 2.6 | 0.63 |
| Example 13 | 2.8 | 0.15 | 610 | 55 | 0.51 | 2.6 | 0.61 |
| Example 14 | 2.9 | 0.14 | 620 | 45 | 0.49 | 2.6 | 0.59 |
| Example 15 | 3.1 | 0.15 | 600 | 45 | 0.51 | 2.6 | 0.62 |
| Example 16 | 2.9 | 0.16 | 605 | 45 | 0.52 | 2.6 | 0.59 |
| Example 17 | 2.8 | 0.14 | 590 | 55 | 0.51 | 2.6 | 0.61 |
| Example 18 | 3.1 | 0.16 | 595 | 45 | 0.52 | 2.6 | 0.59 |
| Example 19 | 3.1 | 0.14 | 595 | 45 | 0.52 | 2.6 | 0.62 |
| Example 20 | 3.1 | 0.15 | 605 | 45 | 0.52 | 2.6 | 0.61 |
| Example 21 | 2.8 | 0.15 | 495 | 55 | 0.80 | 2.4 | 0.66 |
| Example 22 | 2.9 | 0.04 | 510 | 45 | 0.46 | 2.4 | 0.21 |
| Example 23 | 2.9 | 0.29 | 640 | 45 | 0.45 | 2.4 | 0.22 |

| | UV-Vis properties | | Property evaluation | | |
|---|---|---|---|---|---|
| | 600 nm absorbance | 750 nm absorbance | Gas adsorptivity | Gas decomposability | Amount of coarse particles |
| Example 1 | 0.39 | 0.23 | G1 | G1 | A |
| Comparative Example 1 | 0.33 | 0.23 | G1 | G4 | A |
| Comparative Example 2 | 0.01 | 0 | G1 | G4 | A |
| Comparative Example 3 | 0 | 0 | G1 | G4 | A |
| Comparative Example 4 | 0.35 | 0.24 | G4 | G2 | A |
| Comparative Example 5 | 0.36 | 0.23 | G1 | G2 | C |
| Comparative Example 6 | 0 | 0 | G1 | G4 | A |
| Example 2 | 0.40 | 0.22 | G1 | G2 | A |
| Example 3 | 0.37 | 0.25 | G2 | G1 | A |
| Example 4 | 0.39 | 0.21 | G2 | G1 | A |
| Example 5 | 0.41 | 0.22 | G1 | G1 | B |

TABLE 5-continued

| | | | | | |
|---|---|---|---|---|---|
| Example 6 | 0.40 | 0.23 | G1 | G1 | A |
| Example 7 | 0.41 | 0.25 | G1 | G1 | A |
| Example 8 | 0.39 | 0.22 | G1 | G1 | A |
| Example 9 | 0.37 | 0.23 | G1 | G1 | A |
| Example 10 | 0.37 | 0.23 | G1 | G1 | A |
| Example 11 | 0.35 | 0.21 | G2 | G2 | A |
| Example 12 | 0.40 | 0.24 | G2 | G2 | A |
| Example 13 | 0.37 | 0.23 | G2 | G2 | A |
| Example 14 | 0.38 | 0.22 | G2 | G2 | A |
| Example 15 | 0.38 | 0.26 | G2 | G2 | A |
| Example 16 | 0.39 | 0.22 | G2 | G2 | A |
| Example 17 | 0.37 | 0.21 | G2 | G2 | A |
| Example 18 | 0.37 | 0.23 | G2 | G2 | A |
| Example 19 | 0.35 | 0.20 | G2 | G2 | A |
| Example 20 | 0.37 | 0.24 | G2 | G2 | A |
| Example 21 | 0.40 | 0.24 | G3 | G1 | A |
| Example 22 | 0.14 | 0.11 | G2 | G2 | A |
| Example 23 | 0.10 | 0.08 | G2 | G2 | A |

TABLE 6

| | Properties of silica-titania composite aerogel particles | | | | | | UV-Vis properties |
|---|---|---|---|---|---|---|---|
| | Element ratio Si/Ti of base particle | XPS peak intensity ratio | BET specific surface area (m²/g) | Dp (nm) | Da (μm) | GSDv | 450 nm absorbance |
| Example 101 | 3.0 | 0.14 | 705 | 54 | 0.50 | 2.6 | 0.63 |
| Comparative Example 101 | 7.2 | 0.17 | 785 | 44 | 0.60 | 2.9 | 0.55 |
| Comparative Example 102 | 3.2 | 0.02 | 700 | 50 | 0.50 | 2.6 | 0.01 |
| Comparative Example 103 | 3.2 | 0.45 | 705 | 53 | 0.50 | 2.6 | 0.02 |
| Comparative Example 104 | 2.9 | 0.15 | 175 | 110 | 0.20 | 1.1 | 0.61 |
| Comparative Example 105 | 3.0 | 0.16 | 1305 | 21 | 4.50 | 13 | 0.62 |
| Comparative Example 106 | 2.8 | 0.14 | 700 | 53 | 0.50 | 2.6 | 0 |
| Example 102 | 5.6 | 0.16 | 705 | 45 | 0.50 | 2.5 | 0.59 |
| Example 103 | 0.04 | 0.14 | 395 | 75 | 0.50 | 2.5 | 0.65 |
| Example 104 | 3.2 | 0.15 | 215 | 82 | 0.20 | 1.7 | 0.59 |
| Example 105 | 3.3 | 0.17 | 1100 | 25 | 2.85 | 9.5 | 0.62 |
| Example 106 | 3.1 | 0.13 | 590 | 45 | 0.50 | 2.5 | 0.61 |
| Example 107 | 2.3 | 0.14 | 610 | 55 | 0.50 | 2.5 | 0.61 |
| Example 108 | 2.7 | 0.15 | 560 | 55 | 0.50 | 2.5 | 0.61 |
| Example 109 | 3.1 | 0.15 | 610 | 55 | 0.50 | 2.5 | 0.62 |
| Example 110 | 3.1 | 0.13 | 605 | 45 | 0.50 | 2.5 | 0.62 |
| Example 111 | 2.9 | 0.15 | 600 | 48 | 0.50 | 2.5 | 0.60 |
| Example 112 | 2.9 | 0.13 | 600 | 52 | 0.50 | 2.5 | 0.60 |
| Example 113 | 3.1 | 0.14 | 610 | 48 | 0.50 | 2.5 | 0.59 |
| Example 114 | 3.1 | 0.13 | 610 | 52 | 0.50 | 2.5 | 0.59 |
| Example 115 | 2.9 | 0.14 | 600 | 48 | 0.50 | 2.5 | 0.60 |
| Example 116 | 2.9 | 0.15 | 605 | 52 | 0.50 | 2.5 | 0.61 |
| Example 117 | 2.8 | 0.13 | 605 | 48 | 0.50 | 2.5 | 0.61 |
| Example 118 | 2.8 | 0.15 | 605 | 48 | 0.50 | 2.5 | 0.62 |
| Example 119 | 2.7 | 0.13 | 605 | 48 | 0.50 | 2.5 | 0.62 |
| Example 120 | 3.1 | 0.14 | 605 | 52 | 0.50 | 2.5 | 0.61 |
| Example 121 | 3.1 | 0.13 | 510 | 52 | 0.70 | 2.5 | 0.59 |
| Example 122 | 2.9 | 0.03 | 505 | 51 | 0.50 | 2.5 | 0.21 |
| Example 123 | 2.8 | 0.28 | 640 | 49 | 0.50 | 2.5 | 0.21 |

| | UV-Vis properties | | Property evaluation | | |
|---|---|---|---|---|---|
| | 600 nm absorbance | 750 nm absorbance | Gas adsorptivity | Gas decomposability | Amount of coarse particles |
| Example 101 | 0.36 | 0.22 | G1 | G1 | A |
| Comparative Example 101 | 0.34 | 0.24 | G1 | G4 | A |
| Comparative Example 102 | 0.01 | 0 | G1 | G4 | A |
| Comparative Example 103 | 0.02 | 0.01 | G1 | G3 | A |
| Comparative Example 104 | 0.37 | 0.23 | G4 | G1 | A |

TABLE 6-continued

|  |  |  |  |  |  |
|---|---|---|---|---|---|
| Comparative Example 105 | 0.37 | 0.22 | G1 | G1 | C |
| Comparative Example 106 | 0 | 0 | G1 | G4 | A |
| Example 102 | 0.38 | 0.23 | G1 | G2 | A |
| Example 103 | 0.37 | 0.23 | G2 | G1 | A |
| Example 104 | 0.37 | 0.21 | G2 | G1 | A |
| Example 105 | 0.38 | 0.22 | G1 | G1 | B |
| Example 106 | 0.37 | 0.25 | G1 | G1 | A |
| Example 107 | 0.38 | 0.25 | G1 | G1 | A |
| Example 108 | 0.37 | 0.24 | G1 | G1 | A |
| Example 109 | 0.37 | 0.23 | G1 | G1 | A |
| Example 110 | 0.39 | 0.23 | G1 | G1 | A |
| Example 111 | 0.37 | 0.21 | G2 | G2 | A |
| Example 112 | 0.36 | 0.24 | G2 | G2 | A |
| Example 113 | 0.36 | 0.23 | G2 | G2 | A |
| Example 114 | 0.38 | 0.25 | G2 | G2 | A |
| Example 115 | 0.37 | 0.24 | G2 | G2 | A |
| Example 116 | 0.39 | 0.22 | G2 | G2 | A |
| Example 117 | 0.40 | 0.22 | G2 | G2 | A |
| Example 118 | 0.40 | 0.23 | G2 | G2 | A |
| Example 119 | 0.41 | 0.20 | G2 | G2 | A |
| Example 120 | 0.39 | 0.24 | G2 | G2 | A |
| Example 121 | 0.35 | 0.24 | G3 | G1 | A |
| Example 122 | 0.14 | 0.11 | G2 | G2 | A |
| Example 123 | 0.10 | 0.08 | G2 | G2 | A |

The organometallic compounds shown in Tables 2 and 4 are detailed as follows:

Isopropyl triisostearoyl titanate: PLENACT TTS available from Ajinomoto Co., Inc.

Acetoalkoxyaluminum diisopropylate: PLENACT AL-M available from Ajinomoto Co., Inc.

As may be seen from the results of the property evaluation shown in Tables 5 and 6, the photocatalytic activities in the visible range are higher in Examples than in Comparative Examples. In addition, the amount of coarse particles is small in Examples.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A silica-titania composite aerogel particle comprising:
a base particle that includes silicon and titanium whose element ratio Si/Ti is more than 0 and 6 or less; and
a surface layer that is present on the base particle and includes a metal compound having a metal atom and a hydrocarbon group,
and the silica-titania composite aerogel particle has absorption at wavelengths of 450 nm and 750 nm in a visible absorption spectrum,
has a BET specific surface area in a range of 200 m$^2$/g to 1,200 m$^2$/g, and
has a value A being calculated by formula below in a range of 0.03 to 0.3:

$A$=(peak intensity of C—O bond+peak intensity of C=O bond)/(peak intensity of C—C bond+peak intensity of C=C bond)

wherein the peak intensity is a value obtained from a C 1s XPS spectrum.

2. The silica-titania composite aerogel particle according to claim 1, wherein the silica-titania composite aerogel particle has absorption over an entire wavelength range of 400 nm to 800 nm in the visible absorption spectrum.

3. The silica-titania composite aerogel particle according to claim 1, wherein the silica-titania composite aerogel particles have a volume average particle size in a range of 0.1 μm to 3 μm and a volume particle size distribution in a range of 1.5 to 10.

4. The silica-titania composite aerogel particle according to claim 1, wherein primary particles included in the silica-titania composite aerogel particle have an average size in a range of 1 nm to 90 nm.

5. The silica-titania composite aerogel particle according to claim 1, further having an intermediate layer made of titania between the base particle and the surface layer.

6. The silica-titania composite aerogel particle according to claim 1, wherein the surface layer includes the metal compound bonded to the base particle through an oxygen atom.

7. The silica-titania composite aerogel particle according to claim 1, wherein the metal compound has the hydrocarbon group directly bonded to the metal atom.

8. The silica-titania composite aerogel particle according to claim 1, wherein the metal atom is a silicon atom.

9. The silica-titania composite aerogel particle according to claim 1, wherein the hydrocarbon group is included in a saturated aliphatic hydrocarbon group of 1 to 20 carbon atoms, an unsaturated aliphatic hydrocarbon group of 2 to 20 carbon atoms, or an aromatic hydrocarbon group of 6 to 20 carbon atoms.

10. The silica-titania composite aerogel particle according to claim 1, wherein the hydrocarbon group is included in a saturated aliphatic hydrocarbon group of 1 to 20 carbon atoms.

11. The silica-titania composite aerogel particle according to claim 1, wherein the hydrocarbon group is included in a saturated aliphatic hydrocarbon group of 4 to 10 carbon atoms.

12. The silica-titania composite aerogel particle according to claim 1, wherein the element ratio of silicon to titanium, Si/Ti, in the base particle is 0.05 or more and 4 or less.

13. The silica-titania composite aerogel particle according to claim 1, wherein the value A calculated by the formula is in a range of 0.04 to 0.25.

14. The silica-titania composite aerogel particle according to claim 1, wherein the BET specific surface area is in a range of 300 $m^2/g$ to 1,100 $m^2/g$.

15. The silica-titania composite aerogel particle according to claim 1, wherein the silica-titania composite aerogel particles have a volume average particle size in a range of 0.3 μm to 2.8 μm.

16. A photocatalyst-forming composition comprising:
the silica-titania composite aerogel particle according to claim 1; and
at least one compound selected from the group consisting of a dispersion medium and a binder.

17. A photocatalyst comprising the silica-titania composite aerogel particle according to claim 1.

* * * * *